(12) United States Patent
Chang et al.

(10) Patent No.: US 10,696,567 B2
(45) Date of Patent: Jun. 30, 2020

(54) WATER TREATMENT USING AN IRON AND CLAY-BASED SORPTION MEDIA

(71) Applicant: UNIVERSITY OF CENTRAL FLORIDA RESEARCH FOUNDATION, INC., Orlando, FL (US)

(72) Inventors: Ni-Bin Chang, Winter Springs, FL (US); Martin P. Wanielista, Winter Park, FL (US)

(73) Assignee: UNIVERSITY OF CENTRAL FLORIDA RESEARCH FOUNDATION, INC., Orlando, FL (US)

(*) Notice: Subject to any disclaimer, the term of this patent is extended or adjusted under 35 U.S.C. 154(b) by 0 days.

(21) Appl. No.: 16/398,050

(22) Filed: Apr. 29, 2019

(65) Prior Publication Data
US 2019/0256374 A1  Aug. 22, 2019

Related U.S. Application Data

(62) Division of application No. 15/886,330, filed on Feb. 1, 2018, now abandoned.

(51) Int. Cl.
*B01D 24/02* (2006.01)
*B01J 20/02* (2006.01)
(Continued)

(52) U.S. Cl.
CPC .............. *C02F 1/281* (2013.01); *B01D 24/02* (2013.01); *B01J 20/0229* (2013.01);
(Continued)

(58) Field of Classification Search
CPC ................ C02F 1/281; C02F 2101/105; C02F 2101/163; C02F 2103/001;
(Continued)

(56) References Cited

U.S. PATENT DOCUMENTS

| | | | |
|---|---|---|---|
| 8,512,555 B1 * | 8/2013 | Allen, II | B01D 24/08 210/170.03 |
| 2010/0051540 A1 * | 3/2010 | Wanielista | B01J 20/043 210/602 |
| 2010/0062933 A1 * | 3/2010 | Wanielista | B01J 20/10 502/402 |

OTHER PUBLICATIONS

Erickson, A.J., et al., "Capturing phosphates with iron enhanced sand filtration", Water Research, 46, pp. 3032-3042. (Year: 2012).*
(Continued)

*Primary Examiner* — Benjamin L Lebron
(74) *Attorney, Agent, or Firm* — Smith & Hopen, P.A.; Paul Murty

(57) ABSTRACT

A method of water treatment includes flowing water that includes nitrogen and phosphorus compounds through a sorption media composition within at least one chamber of a water treatment system. The composition comprises iron filings comprising at least 5 volume (vol) % of the composition, sand particles comprising at least 10 vol % of the composition; and clay particles comprising at least 2 vol % of the composition. The iron filings, sand particles, and clay particles are mixed together. During the flowing the clay particles attract the nitrogen and phosphorus compounds which become absorbed onto a surface of the iron filings and the clay resulting in a removal of the nitrogen and phosphorus compounds and the generation of reaction products. Nitrogen and phosphorus are then recovered from the reaction products.

11 Claims, 17 Drawing Sheets

(51) Int. Cl.
*B01J 20/12* (2006.01)
*B01J 20/28* (2006.01)
*C02F 1/28* (2006.01)
*B01J 20/10* (2006.01)
*B01J 20/04* (2006.01)
*C02F 103/00* (2006.01)
*C02F 101/10* (2006.01)
*C02F 101/16* (2006.01)

(52) U.S. Cl.
CPC ............ *B01J 20/103* (2013.01); *B01J 20/12* (2013.01); *B01J 20/28004* (2013.01); *B01J 20/28014* (2013.01); *B01J 20/28054* (2013.01); *B01J 20/043* (2013.01); *B01J 2220/4825* (2013.01); *B01J 2220/4831* (2013.01); *B01J 2220/4893* (2013.01); *C02F 2101/105* (2013.01); *C02F 2101/163* (2013.01); *C02F 2103/001* (2013.01); *C02F 2201/002* (2013.01)

(58) Field of Classification Search
CPC ............ C02F 2201/002; B01J 20/0229; B01J 20/043; B01J 20/103; B01J 20/12; B01J 20/28004; B01J 20/28014; B01J 20/28054; B01J 2220/4825; B01J 2220/4831; B01J 2220/4893; B01D 24/02
See application file for complete search history.

(56) References Cited

OTHER PUBLICATIONS

Delaware Department of natural resources and environmental control, "3.06.02 post construction stormwater BMP standards and specifications", Mar. (Year: 2013).*
Reddy, K.R. et al., "Nutrients removal from urban stormwater by different filter materials", Water air soil pollution, 225:1178. (Year: 2013).*
Berney, E.S. et al., "Mechanical and physical properties of ASTM C33 Sand", US Army Corps of Engineerrs, ERDC/GSL TR-08-02. Feb. (Year: 2008).*
Huang, C.P. et al., "Nitrate reduction by metallic iron", Water research, vol. 32, No. 8,, pp. 2257-2264. (Year: 1998).*
Sarkhot, D.V. et al., "Effectiveness of biochar for sorption of ammonium and phosphate from dairy effluent", Journal of environmental quality, 42, pp. 1545-1554. (Year: 2013).*
Eagle, B., "Soil texture: sand, silt and clay", thinkingcountry, wordpress.com. Nov. 30. (Year: 2016).*
O'Reilly, A., et al., "Nutrient removal using biosorption activated media: preliminary biogeochemical assessment of an innovative stormwater infiltration basin", Science of the Total Environment, 432, pp. 227-242. (Year: 2012).*

* cited by examiner

WATER TREATMENT USING AN IRON AND CLAY-BASED SORPTION MEDIA

CROSS-REFERENCE RELATED APPLICATIONS

This application is a Divisional application claiming priority to U.S. patent application Ser. No. 15/886,330 entitled IRON AND CLAY-BASED SORPTION MEDIA FOR WATER TREATMENT, filed on Feb. 1, 2018, which is herein incorporated by reference in its entirety.

FEDERALLY SPONSORED RESEARCH OR DEVELOPMENT

This invention was made with Government support under Grant No. ICER 1830036 awarded by the National Science Foundation and Federal Aid No. HR01-055-H awarded by the Florida Department of Transportation. The government has certain rights in the invention.

FIELD

Disclosed embodiments relate to green sorption media for treatment of water that typically includes nitrogen and phosphorous.

BACKGROUND

Global population growth and degradation of freshwater resources has resulted in a global water crisis. In response to this situation, stormwater reuse is gaining worldwide attention as a technique to overcome water shortages and alleviate demand on typical freshwater resources. Stormwater reuse can be defined as the collection, accumulation, treatment or purification, and storing of stormwater for eventual use as an alternative freshwater resource. However, currently there is limited technology available for the reliable treatment of stormwater for reuse.

Nutrients, such as nitrogen and phosphorus, are an essential component to maintaining a healthy aquatic environment. However, excess nutrients such as nitrogen and phosphorus can negatively impact aquatic environments and human health, and cause stormwater to be deemed unfit for reuse. Stormwater runoff into waterbodies, wastewater, and agricultural discharge can contain excessive nutrients such as nitrogen and phosphorous.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize enhanced regulatory standards promulgated by government agencies including the US Environmental Protection Agency (US EPA, 2013), such as regarding the Numeric Nutrient Criteria, have rendered known green sorption media ineffective in cases where the nutrient concentration in stormwater, wastewater, and agricultural discharge is high. It has been found that disclosed iron-filings based Green Environmental Media (IFGEM) compositions that include both sand and clay particles are efficient for removal of nitrogen and phosphorus, as well as for the optional recovery/reuse of nitrogen and phosphorous from the IFGEM after use.

Disclosed embodiments include a sorption media composition that comprises iron filings of at least 5 volume (vol) % of the composition, sand particles including primarily silica of at least 10 vol % of the composition, and clay particles of at least 2 vol % of the composition. The iron filings, sand particles and clay particles are mixed together homogeneously. The infiltration rate through a 30 inch depth of the composition is 0.001 cm/sec to 0.028 cm/sec, generally being 0.003 cm/sec to 0.028 cm/sec.

Disclosed embodiments also include a method of water treatment comprising flowing water that includes nitrogen and phosphorus compounds through a sorption media composition within at least one chamber of a water treatment system. The composition comprises iron filings comprising at least 5 volume (vol) % of the composition, sand particles comprising at least 10 vol % of the composition; and clay particles comprising at least 2 vol % of the composition. The iron filings, sand particles, and clay particles are mixed together. During the flowing the clay particles attract the nitrogen and phosphorus compounds which become absorbed onto a surface of the iron filings and the clay resulting in a removal of the nitrogen and phosphorus compounds and a generation of reaction products. Nitrogen and phosphorus are then recovered from the reaction products.

DETAILED DESCRIPTION

Figure 1:
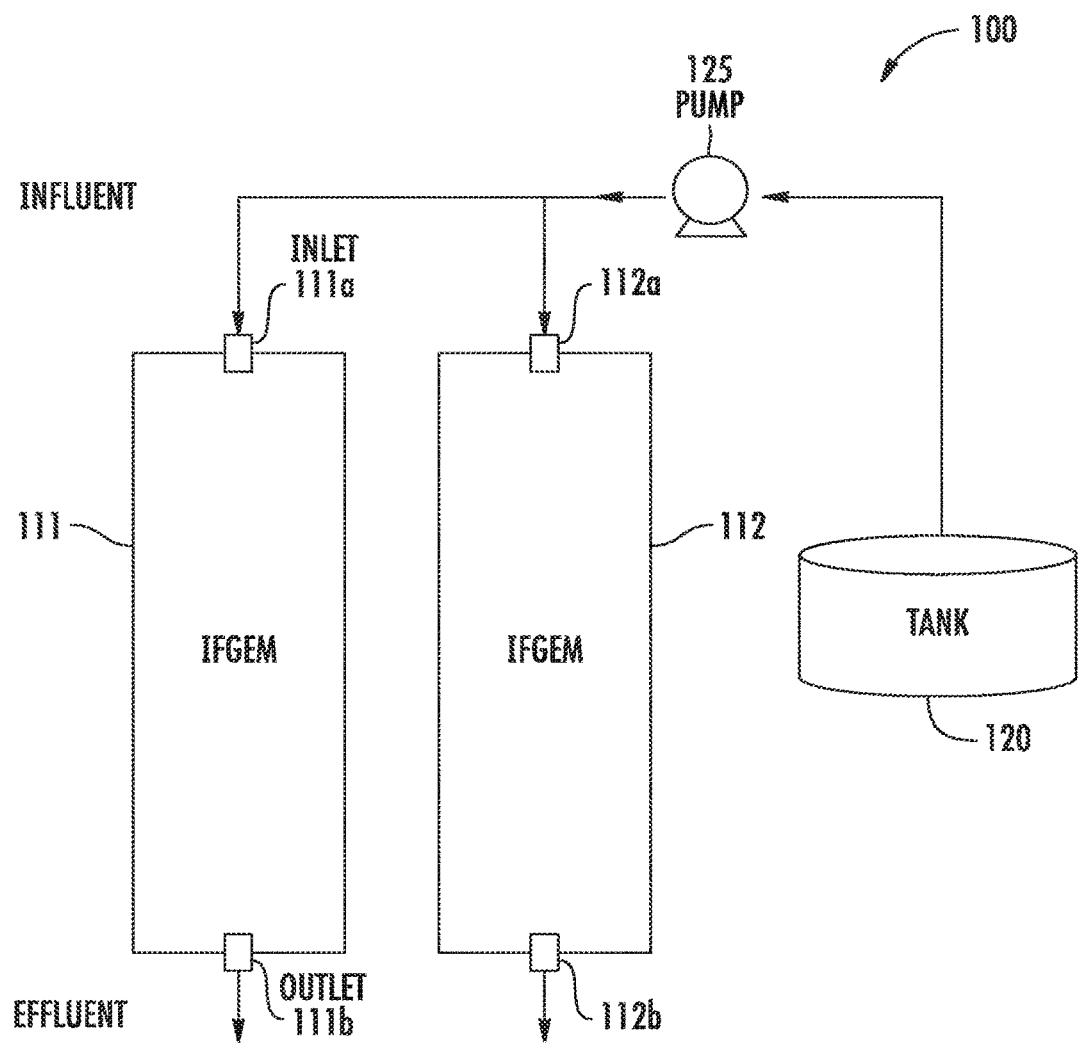
FIG. 1 shows an example simplified water treatment system comprising at least one media chamber having a disclosed IFGEM composition therein.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Disclosed IFGEM compositions include iron filings, sand particles comprising primarily silica (by weight), clay particles, and optionally other constituents. The other constituents can comprise recycled materials such as tire crumb, wood sawdust, and paper. The iron filings is at least 5 vol % of the composition, with a particle size range generally in the longest direction being primarily from 0.25 mm to 3.38 mm. Atomic iron provides the electron donor for the IFGEM composition. Iron filings grinded from iron is very different from Nanoscale zero valent iron (NZVI) particles in physiochemical properties due to the particle size distribution. It is recognized that NZVI particles cannot be applied in Best Management Practices (BMP) for treating the stormwater runoff because the nanoscale size renders such particles easily washed away.

The sand particles are at least 10 vol % of the composition, generally being in a range from 40 to 85 vol %. The clay particles are at least 2 vol % of the composition, generally being in the range from 5 to 12.5 vol %. The iron filings, sand particles and clay particles are homogenously mixed together so that as noted above an infiltration rate through a 30 inches depth of the composition is 0.001 cm/sec to 0.028 cm/sec, generally being 0.003 cm/sec to 0.028 cm/sec. Too high an infiltration rate can result in an insufficient contact time for effective nutrient removal.

Mechanisms are described below that are believed to explain the observed phenomena provided by disclosed IFGEMs. Although the mechanisms described herein are believed to be accurate, disclosed embodiments may be practiced independent of the particular mechanism(s) that may be operable. It is believed that the nitrate ($NO^{-3}$) reduction provided is significant due to the inclusion of elemental iron as an electron donor. Ammonia ($NH_3$) may be produced as a byproduct through nitrate reduction, and phosphate ($PO_4^{-3}$) removal is enhanced due to the generation of ferrous ion, ferric ion and iron oxides.

The clay in the composition together with the iron particles converts nitrite ($NO^{-2}$) to ammonia with the aid of the iron as the electron donor and absorption by the clay, while iron oxide is produced by oxidation of iron particles (to remove dissolved oxygen (DO)) which can also precipitate phosphate, generally as $FePO_4$, at the same time. The infiltration rate of the IFGEM composition (e.g., 0.003 cm/sec to 0.028 cm/sec) may be maintained such that the treatment capacity (gpm) can be maintained over time in a sustainable way without clogging, while both nitrogen and phosphorus can be removed from the water simultaneously.

The iron particles provide electrons in a slow-releasing process that is expected to show reasonable reaction rate and longer life expectancy when compared to known sorption media based on known NZVI particles. The formation of ferrous and ferric ion in the process of nitrate reduction is generally a significant help in phosphorus precipitation due to the production of iron oxides recognized as a good phosphorus adsorbent. Economically speaking, as a kind of recyclable from industry, iron filings is much more affordable than other forms of iron for large-scale BMP implementation.

Disclosed IFGEMs differ from known sorption media in several aspects. Disclosed IFGEMs can be used for phosphorus removal in high DO environments (e.g., 2% to 9% DO in water) and short hydraulic residence time. Disclosed IFGEMs harmonize the simultaneous removal between nitrogen and phosphorus with complementary effect due to the appropriate blending of clay and iron particles. Disclosed IFGEMs after use may be used to recover the ammonia and phosphate for possible reuse as a soil amendment to utilize trapped ammonia and precipitated phosphate in the IFGEMS to be applied to agricultural fields as a soil amendment, if deemed cost effective.

Iron filings are available commercially in a variety of size ranges, or can be generated by crushing or grinding. Any type of grinder can generally be employed for this purpose. The shape of the iron filings is similar to dust being mini-slice in shape. The sand particles generally comprise primarily silica (by volume) usually in the form of quartz. Calcium carbonate may be included in a disclosed composition in a concentration generally at least 2 vol %. The sand particle shape is generally spherical. The sand particles are generally in the size range primarily having a diameter of between 0.074 and 4.75 millimeters.

Clay particles comprise hydrous aluminum phyllosilicates, sometimes with some variable but minor amounts of iron, magnesium, alkali metals, alkaline earths, and other cations which occur naturally with the clay. The clay particles are generally relatively small as compared to the iron and sand particles. The clay particles are generally 0.2 µm to 5 µm in size having a multi-faceted shape.

One particular example disclosed IFGEM composition, referred to herein as IFGEM2, comprises 80 vol % sand, 10 vol % tire crumb, 5 vol % pure clay, and 5 vol % grinded iron filings. The IFGEM2 composition is discussed in the Examples section below showing its performance. Excellent performance for nitrate reduction is provided even in varying pH conditions from 2 to 10. Removal and recovery of essentially all generated ammonia, and precipitated phosphorous in neutral, acidic, and basic water is also provided.

Disclosed embodiments also include reactors for stormwater treatment systems. FIG. 1 shows a simplified water treatment system 100 for treating water that typically includes significant levels of nitrogen and phosphorous, such as stormwater runoff, wastewater effluent, or agricultural discharge. The water treatment system 100 includes reactors comprising media chamber 111 having an inlet 111a and an outlet 111b, and media chamber 112 having an inlet 112a and an outlet 112b, each having a disclosed IFGEM composition shown therein. A pump 125 is shown pumping water for treatment shown in a tank 120. The system can comprise a few closed tanks, or open permeable ponds. The stormwater treatment system can operate on a 24-hour continuous cycle.

Disclosed embodiments also include a method of water treatment. Water to be treated is flowed through a disclosed IFGEM composition within at least one media chamber. As noted above, the water to be treated can comprise stormwater runoff, wastewater effluent, or agricultural discharge. The composition can comprise the composition iron filings comprising at least 5 volume (vol) % of the composition; sand particles comprising at least 10 vol % of the composition; and clay particles comprising at least 2 vol % of the composition, where the iron filings, sand particles, and clay particles are mixed together. During the flowing the clay particles attract the nitrogen and phosphorus compounds which become absorbed onto a surface of the iron filings and the clay resulting in a removal of the nitrogen and phosphorus compounds and a generation of reaction products. Nitrogen and phosphorus are then recovered from the reaction products.

The composition can further comprise at least one recycled material selected from tire crumb, wood sawdust, and paper. The reaction products generated can comprise ammonia and ferrous iron. An average size of said clay particles can be less than an average size of the iron filings and an average size of the sand particles, and an average size of the clay particles can be between 0.2 μm and 5 μm. An infiltration rate in a 30 inch depth through the composition can be 0.003 to 0.028 cm/sec. The sand can further comprise at least 2 vol % of calcium carbonate. A porosity of the composition can be 30% to 50%. The nitrogen and phosphorus generated can be utilized as a soil amendment.

Moreover, as noted above the DO content of the water can be 2% to 9%. The method of water treatment can operate in a wide pH range generally from 2 to 10, such as 2 to 7, and in a wide temperature range, such as 4° C. to 35° C.

A related IFGEM referred to as IFGEM1 lacks clay and has a larger concentration of ammonia in the outflow (effluent) due to the lack of clay while having larger infiltration rate (about 0.028 cm/s) as compared to IFGEM2 to trigger better phosphorus removal through a precipitation process. IPGM1 comprises 96.2 vol % fine sand, and 3.8 vol % iron filings. With the presence of clay in IFGEM2 and related compositions, however, one is able to reuse ammonia absorbed/adsorbed into clay after use as soil amendment at a later time.

EXAMPLES

Disclosed embodiments of the invention are further illustrated by the following specific Examples, which should not be construed as limiting the scope or content of this Disclosure in any way.

In these Examples, ASTM Standard Practices which are international standards that have been widely accepted and used for many materials, products, and systems are used to determine the particle size distribution, specific gravity, and Brunauer-Emmett-Teller (BET) surface area for disclosed compositions. ASTM D422 was adopted for particle size distribution, ASTMD854 was applied for specific gravity and micrometrics, and ASAP 2020 was applied for BET surface area. Media mixes were tested with the methods mentioned above by a certified laboratory (EMSL, Inc.). Olympus LEXT OLS 3000 Confocal Scanning Microscope was used to characterize the microstructure changes of media mixes before and after the nutrient adsorption. Experiments were conducted at Advanced Materials Processing and Analysis Center (AMPAC) in University of Central Florida (UCF). The plane resolution can be as high as 0.12 μm, with simultaneous 3D and "true color" image acquisition. The media porosity and infiltration rate were tested in a laboratory at UCF, and the porosity was tested by pouring known volume of water to certain volume of media until the media was fully saturated. The infiltration rate was tested through the constant head method in which the volumetric rate of water added to the ring sufficient to maintain a constant head within the ring is measured, the media depth and cross-section area were documented, as well as the time consumed for a certain volume of water flowed through the media.

Isotherm Study on Individual Nutrient Adsorption

In order to understand the thermodynamic characteristics of disclosed IFGEMs in terms of nutrient adsorption tests were conducted under various pHs. The adsorption isotherm experiment was conducted separately for nitrate and phosphorus in IFGEM1 and IFGEM2 with three initial pH values (2, 7, and 10) as an impact factor. Then 30 to 120 g of media mass was prepared in five 500 mL flasks with 300 mL solution of 1.0 mg/L as total nitrate or phosphorus, and the experiment was carried out under room temperature on the rotary shaker with 250 rpm for 1 hour. Then the water sample from each flask was filtered through 0.45-μm membrane filters before the isotherm analysis. The parameters being analyzed are nitrate and ammonia for nitrate isotherm experiment, and total phosphorus for phosphorus isotherm experiment. The Freundlich and Langmuir isotherm equations were adopted to analyze the data. The Freundlich isotherm was obtained by plotting log q versus log C, and the Langmuir isotherm by plotting 1/q versus 1/C. The following two equations shown below as (1) and (2) were applied in this study.

Freundlich Isotherm Equation:

$$\log q_e = \log K_F + \frac{1}{n}\log C_e \qquad (1)$$

Langmuir Isotherm Equation:

$$\frac{1}{q_e} = \left(\frac{1}{K_L q_m}\right)\frac{1}{C_e} + \frac{1}{q_m} \qquad (2)$$

where $C_e$ is the aqueous concentration of adsorbate (mg/L), $q_e$ is the sorbed concentration (mass of absorbed adsorbate/mass adsorbent), $q_m$ is the maximum capacity of adsorbent for adsorbate (maximum mass of absorbed adsorbate/mass adsorbent), C is the aqueous concentration of adsorbent (mass/volume), $K_L$ is the Langmuir equilibrium constant, and $K_F$ is a constant indicative of the relative adsorption capacity of the adsorbent $mg^{1-(1/n)}L^{1/n}g^{-1}$), and n is a constant indicative of the intensity of the adsorption.

Isotherm Study on Competitive Nutrient Adsorption

Singular nutrient specie isotherm study provides fundamental understanding of the specific nutrient absorption characteristics in a batch mode. But competitive absorption widely exists in real storm events as multiple nutrients are in presence. The competitive isotherm absorption study follows exactly the same procedure as the individual nutrient isotherm study with only two exceptions. One is that the solution used in the experiment contains both nitrate and phosphorus in the concentration of 1.0 mg/L for each nutrient, and the other is that only the neutral condition was selected as the initial pH value (pH=7) in this experiment. The absorption results are compared with those counterparts in previous section (i.e., pH=7 scenarios) to retrieve the competitive absorption information when using IFGEM1 and IFGEM2.

Kinetic Study

Performance in terms of filtration kinetics refers to the efficiency of the process and the concentration of the resulting effluent, which is important for the field design and BMP applications. A kinetic study for nitrate reduction and phosphorus adsorption in IFGEM was conducted in a continuous mode using a series of column tests. It assumes that the columns are in a steady state in terms of hydraulic condition and nutrient concentration from each section after running them by 3 hours before sampling. The reaction time is recorded as hydraulic retention time (HRT) from each column section. Equation 3 shown below is a general version of the zero, first, second, or higher order rate equations, which was applied to the kinetic study for determining the best fit reaction orders where C is the concentration of nitrate/phosphorus in solution, n is the reaction order, and k is the reaction constant.

$$\frac{dc}{dt} = k[C]^n \quad (3)$$

In a zero order reaction, the reaction rate is independent of the concentration of reactants. The reaction speed will not change when the reactants' concentration is different. For the first-order reaction, it is a reaction that proceeds at a rate that depends linearly on only one reactant concentration. That is, when the key reactant has a higher concentration, the reaction speed is faster than the lower concentrated case. A second order reaction proceeds at a rate that depends non-linearly on the power of 2 of key reactant's concentration.

Gibbs Energy Change

The Gibbs energy change ($\Delta G^o$) is applied in this study to demonstrate the degree of spontaneity of an absorption or reaction process for phosphorus and nitrate removal. Note that absorption is assumed for the calculation of Gibbs energy. A higher negative value is the reflection of a more energetically favorable absorption/reaction while a higher positive value indicates the absorption/reaction tends to proceed to the opposite direction. Based on thermodynamic law and isotherm study, $\Delta G^o$ is calculated through following equations (4) and (5).

$$\Delta G^o = -RT\ln K_C \quad (4)$$

$$K_C = \frac{q_e M}{C_e V} \quad (5)$$

where $K_C$ is the equilibrium constant without units, T is the absolute temperature in kelvins, M is the mass of absorbent, V is the volume of solution, and R is the gas constant with a value of 8.214 J·mol$^{-1}$·K$^{-1}$.

Design and Setup of Column Tests

Based on the goals of this study, a series of columns were designed to simulate the possible field conditions with a down-flow strategy which are critical for answering science questions 1 and 4 to address a suite of absorption, adsorption, ion exchange, precipitation and oxidation/reduction reactions between sorption media and nutrients. Four big columns (named from A to D) were constructed with 10 cm (4 inches) in diameter of PVC pipes, and each big column was divided into three equivalent sections (top, middle, and bottom) as in 30.45 cm (1 foot) length of each section for the convenience of water sampling. IFGEM1 was filled into all three sections of column A. In column B, IFGEM1 was filled into the top section and BAM was (biosorption activated media) filled into the middle and bottom section. In column C, the natural soil was filled into all three sections as a control column. In column D, IFGEM2 was filled into all three sections. All four big columns from A to D were attached to a wooden board, and the outlet from one section is the inlet of the following one, and the joints between sections were wrapped with parafilm to eliminate outside impacts.

Distilled water was spiked with nitrate and phosphate standard solutions into three concentration levels (nitrate=0.6, 1.2, 1.8 mg/L; TP=0.3, 0.5, 0.7 mg/L) to simulate the fluctuation of nutrient concentrations in real stormwater runoff, agricultural discharge, or wastewater effluent from a secondary wastewater treatment plant. The columns were flushed with distilled water by a couple times to wash off possible contaminants before and after running the columns under different influent conditions. It was expected that physiochemical reduction/absorption is the main mechanism instead of biological effects for nitrate removal, and the only exception is in column C, which is the control column with natural soil collected from SR35 Basin 2 located in Ocala, Fla. The experiment was conducted at room temperature from 22 to 23° C.

A pair of peristaltic pumps were used to pump the influent water from the reservoir with a fixed flow rate of 8 mL/min, which equals to the infiltration rate of 2.33 in/hr that was set up for the current column study in the beginning. The HRT and soil moisture from each section were recorded when the flow rate of the effluents can be stabilized after 3 hours' operation. Water samples were collected with triplicates from the reservoir and outlet of each section. The measurements of DO, oxidation reduction potential (ORP), and pH values were conducted right after collection. DO measurement provides information to determine if the treating environment in column is aerobic or anaerobic.

The ORP values provide critical information of the existence and intensity of oxidation or reduction reactions in different section during the column test. The decrement of ORP would indirectly affect the availability of Gibbs free energy to drive the reaction dynamically, which in turn could be influenced by changing pH values. IFGEM samples were collected before and after the experiment for the morphological comparison under confocal microscope. Nitrate concentrations were analyzed through HACH kit TN830, ammonia concentrations were analyzed through HACH kit TN835, and total phosphorus (TP) concentrations were analyzed with HACH Phosphorus (Total) TNT Reagent Set (summarized in Table 1 below). All water samples were analyzed within 24 hours after collection.

TABLE 1

Column study sample quality parameters and methods

| Parameter | Method/instrument | Range |
|---|---|---|
| pH | Waterproof Double Junction PHTESTR ® 30 | 0 to +14.0 |

TABLE 1-continued

Column study sample quality parameters and methods

| Parameter | Method/instrument | Range |
|---|---|---|
| Dissolved oxygen | HACH HQ40D - IntelliCAL LDO101 LDO | 0.01-20 mg/L |
| ORP | HACH HQ40D - MTC101 | ±1200 mV |
| Soil moisture | EC-5 SMALL SOIL MOISTURE SENSOR | 0-100% |
| Nitrates | Method 10206 | 0.05-13.50 mg/L $NO_3$—N |
| Total phosphorus | DR/800 Method 8190 | 0.06-3.50 mg/L $PO_4$ |
| Ammonia | Method 10205 | 0.015-2.00 mg/L $NH_3$—N |

Overall, this study involves absorption, adsorption, precipitation, ion exchange, and oxidation/reduction reactions. Absorption describes the assimilation of molecular species throughout the bulk of the solid or liquid, such as phosphorus and nitrate absorption to the IFGEM under different pH values. Usually it is not a reversible process when compared with adsorption. Because an adsorption process accumulates molecular species at the surface rather than in the bulk of the solid or liquid, it is usually reversible and temperature sensitive.

Statistical Analysis

In order to figure out if there is significant differences between overall nutrient removal efficiencies over different columns under various influent conditions, a two-way ANOVA analysis was performed with Microsoft Excel packages. This analysis of variance may determine if manipulating the influent concentration and switching to use different sorption media can create significant differences in the nutrient removal. Each ANOVA analysis was considered statistically significant at a confidence interval of 95% ($\alpha=0.05$).

The comparison was made possible in pair of two columns at each time. There are two independent variables, column number and influent concentration, since different columns have different media in it with the impact factor of varying influent concentrations rendering nutrient removal via a triplicate analysis. The p-value results associated with the ANOVA analysis may indicate if there is a significant difference in nutrient removal when the columns or the inlet conditions vary, as well as whether or not there is significant interaction between the two variables. The first null hypothesis $H_0$: the means of nutrients removal grouped by the columns are the same; the second null hypothesis $H_0$: the means of nutrients removal grouped by the inlet conditions are the same; the third null hypothesis $H_0$ means there is no interaction between columns and inlet conditions.

Results

Physical Material Property

Figure 2:
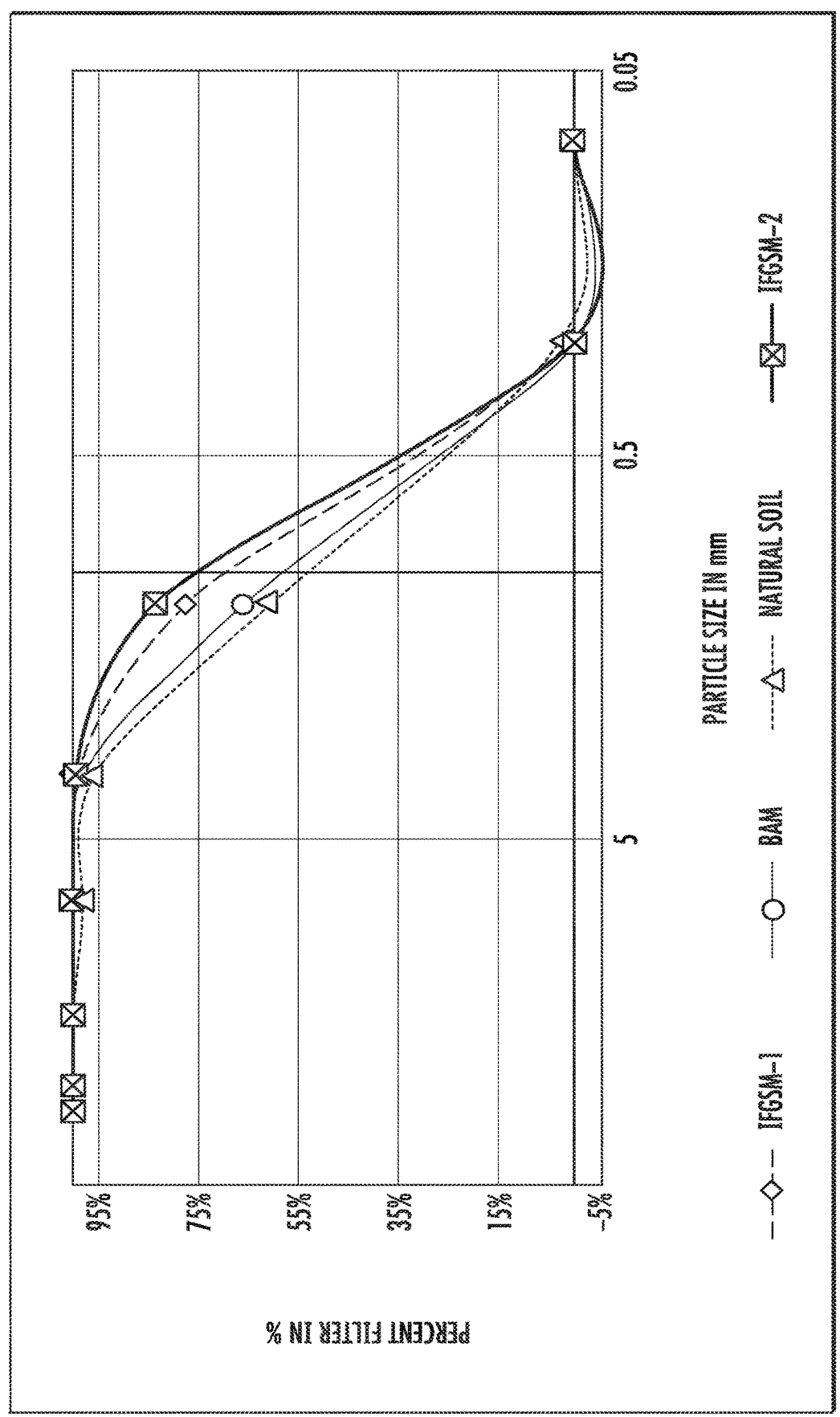
FIG. 2 shows the particle size distribution curves of four media mixtures tested including natural soil and some disclosed IFGEMs.

FIG. 2 shows the particle size distribution curves of the four media mixtures tested including natural soil and disclosed IFGEMs. Two IFGEMs are closer to each other with smaller particle sizes but IFGEM2 has finer particles than IFGEM1, while BAM and natural soil are closer to each other with larger particle sizes than IFGEMs. The physical properties of the four media mixtures are shown in Table 2 below. BAM has the lowest density of 1.39 g/cm³ and the density of soil is 2.36 g/cm³, while the density of IFGEM1 and IFGEM2 is 2.73 and 2.60 g/cm³, respectively. Significant differences exist when comparing the BET surface area. Natural soil shows the highest value of 9.3712 m²/g. The next one is IFGEM2 with a value of 1.3963 m²/g. Then BAM and IFGEM1 follow behind with a value of 0.7059 and 0.3142 m²/g, respectively. In porosity comparison, there are two groups. Whereas IFGEM1 and IFGEM2 show similar results as 36.16% and 37.31%, BAM and natural soil exhibit almost the same results as 40.10% and 40.43%. Another obvious difference across the four media mixes comes with the infiltration rate. Natural soil shows the lowest value of 0.003 cm/s, while the values for IFGEM1, BAM, and IFGEM2 are 0.028, 0.026, and 0.017 cm/s, respectively.

TABLE 2

Material Characteristics

| | IFGEM1 | BAM | Natural Soil | IFGEM2 |
|---|---|---|---|---|
| Density (g/cm³) | 2.73 | 1.39 | 2.36 | 2.60 |
| BET Surface Area (m²/g) | 0.3142 | 0.7059 | 9.3712 | 1.3963 |
| Porosity (%) | 36.16 | 40.10 | 40.43 | 37.31 |
| Infiltration Rate (cm/s) | 0.028 | 0.026 | 0.003 | 0.017 |

Morphological Changes

The pre-treatment and post-treatment morphological images of IFGEM1 and IFGEM2 were obtained. The iron filings pieces were observed clearly before the treatment for both IFGEM recipes. Before treatment, the two main features of IFGEM2 are the existence of tire crumb and the sand particle size is smaller as compared against the media mix of IFGEM1. After treatment, the very first difference is the color, and both IFGEM1 and IFGEM2 tend to turn brown. In addition to the color changes, the iron particles cannot be observed by naked eye after treatment since it was coated by its surrounding materials. When coated iron was exposed during the experimentation, it revealed that the size of the iron particles largely decreased as it was dissolved during the oxidation process.

pH Impacts on Phosphorus and Nitrate Absorption

Figure 3A:
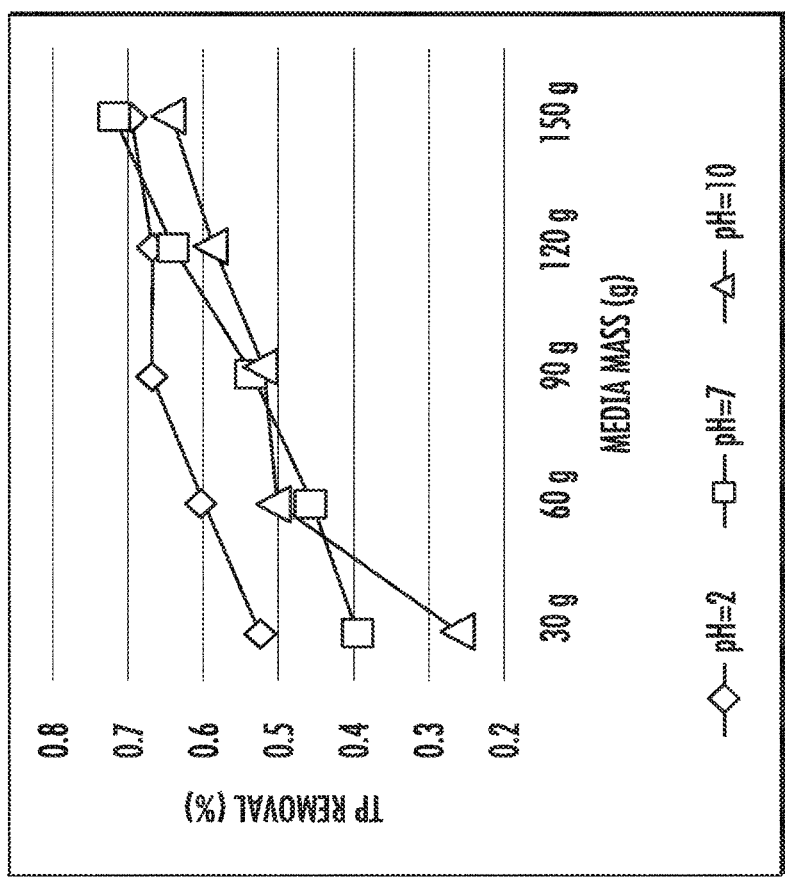
FIGS. 3A and 3B show isotherm study results for IFGEM compositions shown as IFGEM1 and IFGEM2 for phosphate adsorption under three initial pH conditions.
Figure 3B:
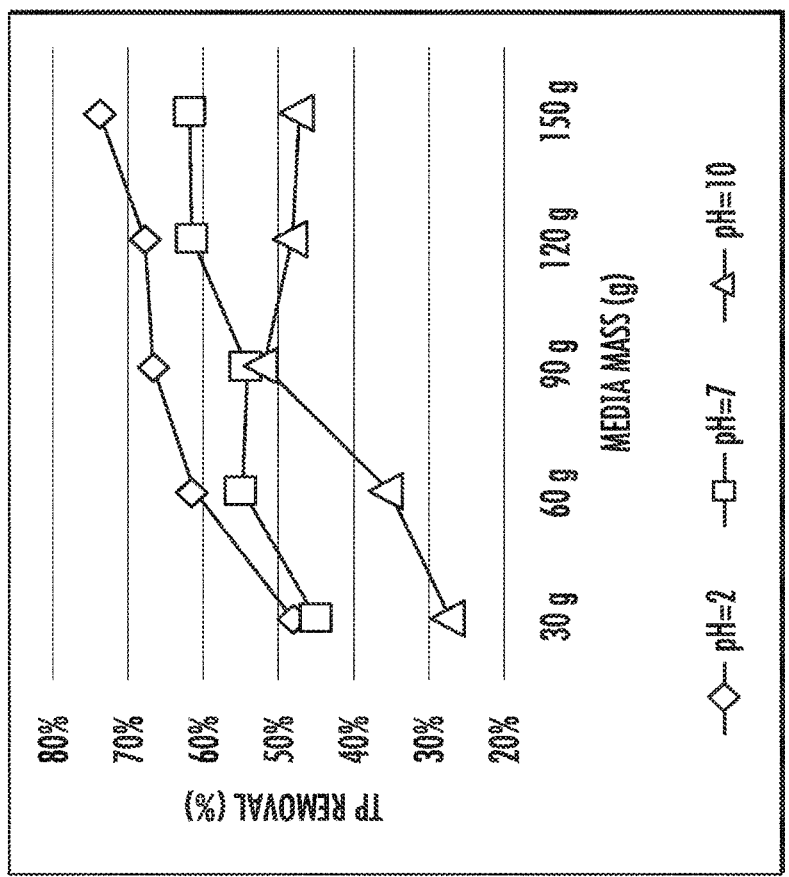

FIGS. 3A and 3B show isotherm study results for IFGEM1 and IFGEM2 for phosphate adsorption under three initial pH conditions. The lower the pH value is, the more phosphorus can be absorbed by both IFGEMs. However, the impacts from the enhancement of pH is more significantly observed in IFGEM1 rather than IFGEM2. The Langmuir and Freundlich isotherm equation parameters of IFGEM1 and IFGEM2 are shown from Table 3 to Table 6 below. As most $1/q_m$ values are negative in Langmuir equation, it is inappropriate to apply for the calculation of maximum absorption capacity ($q_m$). So Freundlich relative absorption capacity is selected from Table 5 and Table 7. The phosphorus absorption capacity of IFGEM1 and IFGEM2 exhibits a higher level in acidic solutions. When the pH value increases from 2 to 10, both IFGEM1 and IFGEM2 tend to lose part of their absorption capacity.

TABLE 3

Phosphorus Absorption Parameters of the Langmuir isotherm
for IFGEM 1 and 2 under various pH conditions

| pH value | IFGEM recipes | Isotherm equation for Langmuir | R-square value | $1/(q_m K_{ads})$ | $1/q_m$ (mg/g) |
|---|---|---|---|---|---|
| 2 | IFGEM1 | y = 259.09x − 305.7 | 0.9336 | 259.09 | −305.7 |
|   | IFGEM2 | y = 409.28x − 700.71 | 0.9145 | 409.28 | −700.71 |
| 7 | IFGEM1 | y = 628.74x − 938.59 | 0.8352 | 628.74 | −938.59 |
|   | IFGEM2 | y = 190.75x + 52.554 | 0.7635 | 190.75 | 52.554 |
| 10 | IFGEM1 | y = 765.92x − 681.48 | 0.7014 | 765.92 | −681.48 |
|    | IFGEM2 | y = 268.13x − 20.922 | 0.7951 | 268.13 | −20.922 | x = $1/C_e$; y = $1/q_e$. Where $C_e$ is the aqueous concentration of phosphorus (mg/L), $q_e$ is the phosphorus concentration sorbed on the media (mg/g).

TABLE 4

Phosphorus Absorption Parameters of the Freundlich isotherm
for IFGEM 1 and 2 under various pH conditions

| pH value | IFGEM recipes | Isotherm equation for Freundlich | R-square value | 1/n | Log K | K ($mg^{1-(1/n)} L^{1/n} g^{-1}$) |
|---|---|---|---|---|---|---|
| 2 | IFGEM1 | y' = 1.7809x' − 1.8089 | 0.9564 | 1.7809 | −1.8089 | 0.0155 |
|   | IFGEM2 | y' = 50.563x' − 0.5833 | 0.9534 | 50.563 | −0.5833 | 0.2610 |
| 7 | IFGEM1 | y' = 3.1346x' − 1.5403 | 0.86 | 3.1346 | −1.5403 | 0.0288 |
|   | IFGEM2 | y' = 1.0972x' − 2.2837 | 0.7342 | 1.0972 | −2.2837 | 0.0052 |
| 10 | IFGEM1 | y' = 2.1192x' − 2.2866 | 0.7799 | 2.1192 | −2.2866 | 0.0052 |
|    | IFGEM2 | y' = 0.9594x' − 2.4206 | 0.7306 | 0.9594 | −2.4206 | 0.0038 | x' = $\log(C_e)$; y' = $\log(q_e)$. Where $C_e$ is the aqueous concentration of phosphorus (mg/L), $q_e$ is the phosphorus concentration sorbed on the media (mg/g).

Figure 4B:
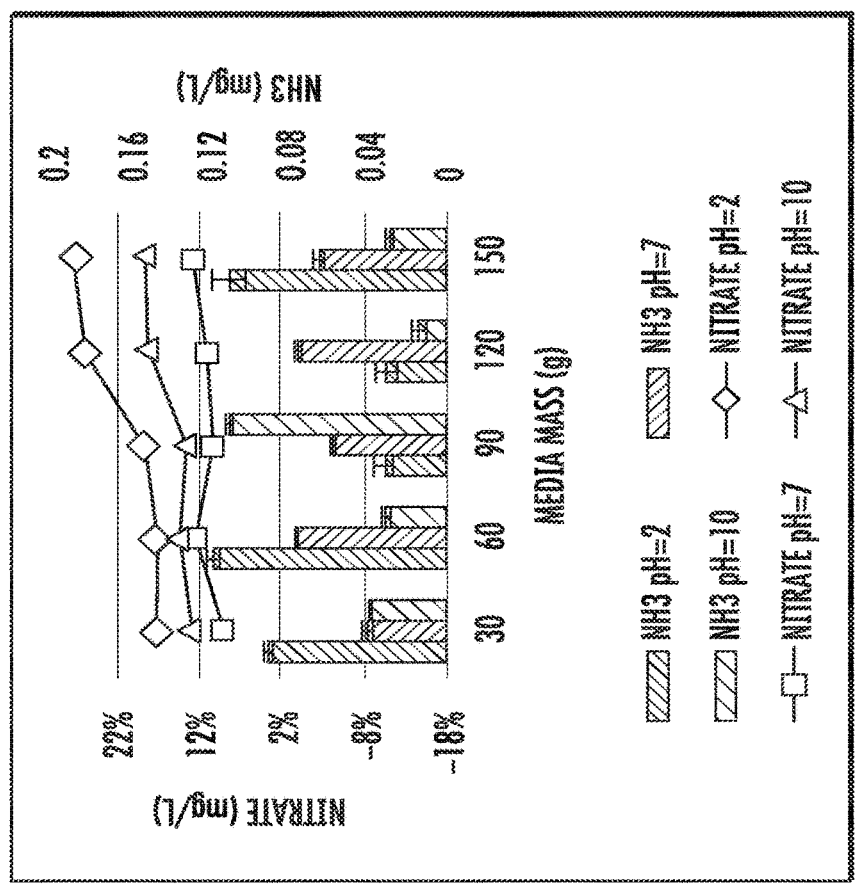
FIGS. 4A and 4B show isotherm study results of IFGEM1 and IFGEM2, respectively, for nitrate reduction under three initial pH conditions.
Figure 4A:
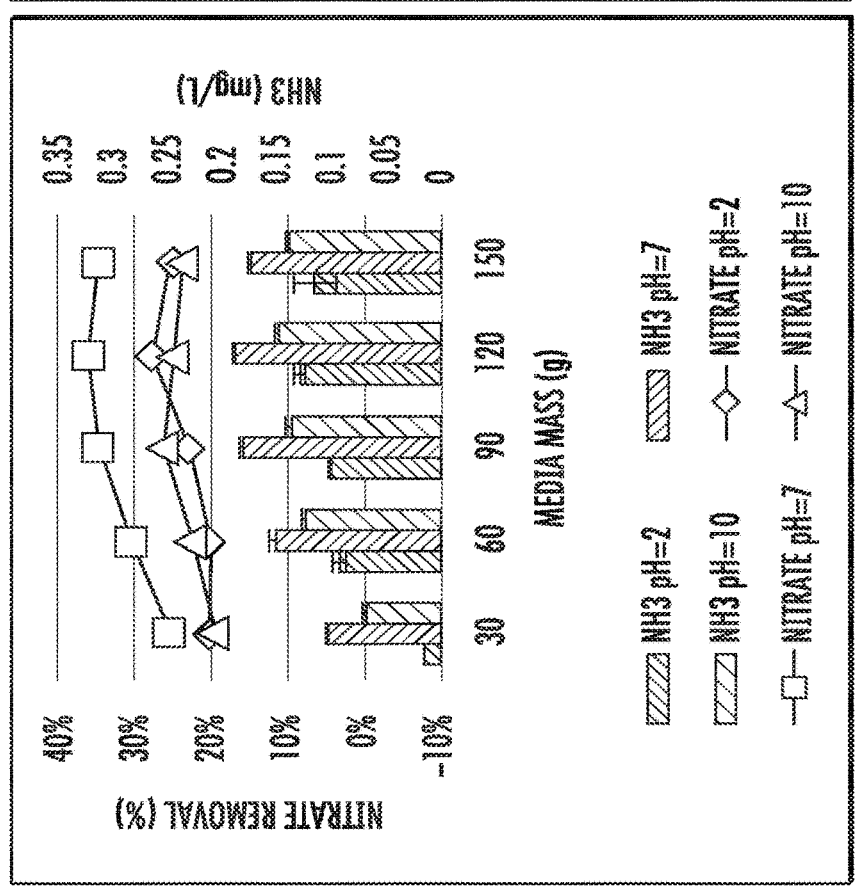

FIGS. 4A and 4B show isotherm study results of IFGEM1 and IFGEM2, respectively, for nitrate reduction under three initial pH conditions as well as the corresponding ammonia generation. For IFGEM1, the best removal achieved when the initial pH=7, the ammonia generation is also optimized under neutral pH, on the contrary, both nitrate removal and ammonia generation would decrease when the initial pH is off neutral. For IFGEM2, the best nitrate removal happened when the initial pH=2, with higher ammonia generation under most scenarios. When the pH increases, nitrate removal and ammonia generation also decrease. The Langmuir and Freundlich isotherm equation parameters of IFGEM1 and IFGEM2 are shown in Table 5 and Table 6. As most $1/q_m$ values are negative in Langmuir equation, it is inappropriate to apply for the calculation of maximum absorption capacity ($q_m$). So the Freundlich relative absorption capacity is selected from Table 7.

TABLE 5

Nitrate absorption parameters of the Langmuir isotherm
for IFGEM 1 and 2 under various pH conditions

| pH value | IFGEM recipes | Isotherm equation for Langmuir | R-square value | $1/(q_m K_{ads})$ | $1/q_m$ (mg/g) |
|---|---|---|---|---|---|
| 2 | IFGEM1 | y = 7554.6x − 7966.9 | 0.5281 | 7554.6 | −7966.9 |
|   | IFGEM2 | y = 5358.5x − 4598.6 | 0.2117 | 5358.5 | −4598.6 |
| 7 | IFGEM1 | y = 3754.5x − 4216.4 | 0.7158 | 3754.5 | −4216.4 |
|   | IFGEM2 | y = 4924.3x − 4456.2 | 0.1362 | 4924.3 | −4456.2 |
| 10 | IFGEM1 | y = 8491.2x − 8153.6 | 0.3644 | 8491.2 | −8153.6 |
|    | IFGEM2 | y = 15821x − 15443 | 0.5845 | 15821 | −15443 | x = $1/C_e$; y = $1/q_e$. Where $C_e$ is the aqueous concentration of nitrate (mg/L), $q_e$ is the nitrate concentration sorbed on the media (mg/g).

TABLE 6

Nitrate absorption parameters of the Freundlich isotherm
for IFGEM 1 and 2 under various pH conditions

| pH value | IFGEM recipes | Isotherm equation for Freundlich | R-square value | 1/n | Log K | K ($mg^{1-(1/n)} L^{1/n} g^{-1}$) |
|---|---|---|---|---|---|---|
| 2 | IFGEM1 | y' = 9.5316x' − 2.2419 | 0.5691 | 9.5316 | −2.2419 | 0.0057 |
|   | IFGEM2 | y' = 5.9821x' − 2.8225 | 0.2768 | 5.9821 | −2.8225 | 0.0015 |
| 7 | IFGEM1 | y' = 7.3878x' − 1.9373 | 0.8565 | 7.3878 | −1.9373 | 0.0116 |
|   | IFGEM2 | y' = 7.7666x' − 3.2904 | 0.0538 | 7.7666 | −3.2904 | 0.0005 |

TABLE 6-continued

Nitrate absorption parameters of the Freundlich isotherm
for IFGEM 1 and 2 under various pH conditions

| pH value | IFGEM recipes | Isotherm equation for Freundlich | R-square value | 1/n | Log K | K ($mg^{1-(1/n)}$ $L^{1/n}$ $g^{-1}$) |
|---|---|---|---|---|---|---|
| 10 | IFGEM1 | y' = 12.039x' − 2.558 | 0.5470 | 12.039 | −2.558 | 0.0028 |
|    | IFGEM2 | y' = 11.872x' − 2.7809 | 0.5542 | 11.872 | −2.7809 | 0.0017 | x' = log($C_e$); y' = log($q_e$). Where $C_e$ is the aqueous concentration of nitrate (mg/L), $q_e$ is the nitrate concentration sorbed on the media (mg/g).

Competitive Absorption

Figure 5B:
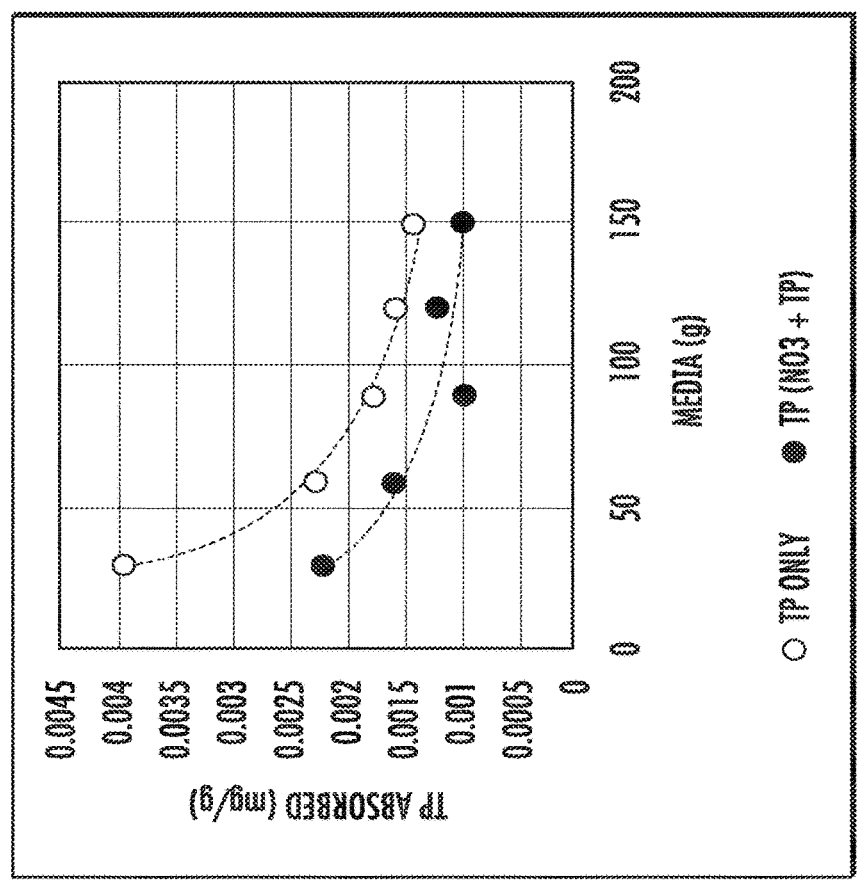
FIGS. 5A and 5B show nitrate and phosphorus results for IFGEM2.
Figure 5A:
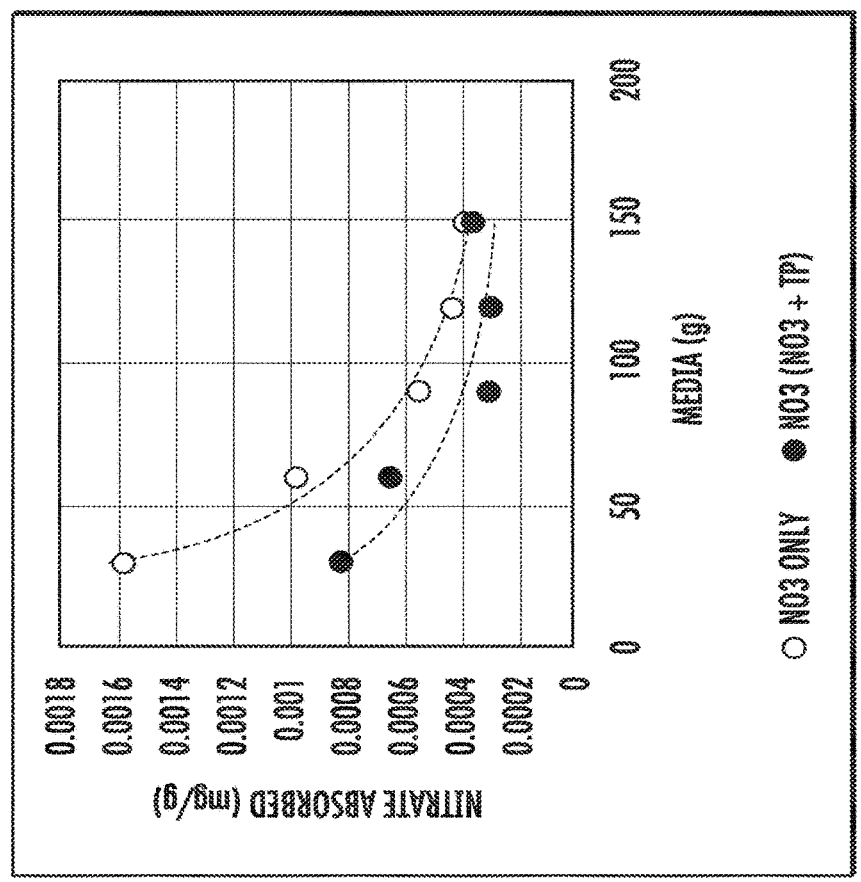

The study of competitive absorption between nitrate and phosphorus was performed when the concentrations of each nutrient are equivalent (~1 mg/L) and co-exist in the solution. FIGS. 5A and 5B show nitrate and phosphorus (shown as TP) results for IFGEM2. The competitive absorption effects between the two nutrient species are confirmed. For IFGEM2, the average nitrate and phosphorus absorption on unit mass of media decreased by 32.88% and 33.33%, respectively.

Absorption Spontaneity

The changes of Gibbs free energy are quantified to examine the spontaneity of absorption/reaction for nutrients removal in IFGEM1 and IFGEM2 under room temperature (~22 to 23° C.). The values of Gibbs free energy from the isotherm study were calculated through equations 4 and 5 and shown in Table 7 and Table 8 (described below). Both IFGEMs tend to enhance the absorption/reaction spontaneity when the applied media mass increases for nitrate and phosphorus removal. In IFGEM1, the nitrate removal/reduction is more likely to happen in neutral pH value, while the acidic and basic initial conditions would require more energy to initiate the reaction. For phosphorus absorption, the absorption spontaneity increases with the decrement of pH value. For IFGEM2, nitrate removal/reduction is less spontaneously since it requires more energy to initiate the reaction under all pH levels. Nevertheless, the phosphorus removal achieved strong spontaneity under acidic conditions than neutral or basic conditions.

TABLE 7

The change of Gibbs free energy (J/mole) with various media mass and pH values under room temperature in IFGEM1

| Initial pH | Nutrients | 30 g | 60 g | 90 g | 120 g | 150 g |
|---|---|---|---|---|---|---|
| 2 | Nitrate | 3448.03 | 3371.85 | 2979.88 | 2395.71 | 2752.66 |
|   | Phosphorus | 235.35 | −1127.85 | −1749.45 | −1864.35 | −2558.38 |
| 7 | Nitrate | 2642.86 | 2050.91 | 1569.03 | 1409.63 | 1559.18 |
|   | Phosphorus | 505.69 | −505.69 | −404.04 | −1163.29 | −1198.84 |
| 10 | Nitrate | 3465.86 | 3080.30 | 2536.31 | 2707.32 | 2839.55 |
|    | Phosphorus | 2387.38 | 1488.06 | 134.41 | 168.04 | 67.19 |

TABLE 8

The change of Gibbs free energy (J/mole) with various media mass and pH under room temperature in IFGEM2

| Initial pH | Nutrients | 30 g | 60 g | 90 g | 120 g | 150 g |
|---|---|---|---|---|---|---|
| 2 | Nitrate | 4003.15 | 3908.96 | 3697.92 | 2667.20 | 5009.01 |
|   | Phosphorus | −249.63 | −1063.71 | −1749.07 | −1749.07 | −2096.16 |
| 7 | Nitrate | 4446.88 | 3817.29 | 4288.10 | 4177.18 | 3819.85 |
|   | Phosphorus | 2184.32 | 1716.06 | 1424.94 | 968.05 | 603.72 |
| 10 | Nitrate | 4750.35 | 4385.02 | 4546.80 | 3690.56 | 3695.60 |
|    | Phosphorus | 2555.43 | −111.89 | −175.88 | −921.54 | −1569.06 |

Column Tests

Column study is the only study that actually tries to mimic the real-world condition. The important parameters of pH, DO, and the oxidation-reduction potential (ORP) from the inlets and each sampling port of the columns can be summarized in Table 9. In general, the ORP values decreased at the top section, then slightly increased at the middle section and decreased again at the bottom section in column over the columns B and C. However, it shows a straight decline of the ORP values over sections for column D for most time. The similar trend happens to the DO test for column D. Obvious DO decrement occurred in column A and D, slightly DO increment occurred in column B and C. For pH changes, column A and D exhibit continuously increment of pH through each section, while column B tends to increase pH at the top section and keeps a lower pH for the rest. Column C shows steady pH values across three sections. Column A and the first section of column B showed lower moisture content that usually less than 20%. However, the rest media has much higher moisture content, and the average moisture content is 35.50%, 35.66%, and 39.33% for BAM, IFGEM2, and natural soil, respectively.

TABLE 9

Average ORP, DO, and pH values in the column study

| Column | Port | Inlet = 0.6 mg/L nitrate | | | Inlet = 1.2 mg/L nitrate | | | Inlet = 1.8 mg/L nitrate | | |
|---|---|---|---|---|---|---|---|---|---|---|
| | | ORP | DO | pH | ORP | DO | pH | ORP | DO | pH |
| | inlet | 327.50 | 8.76 | 6.98 | 316.40 | 7.58 | 7.10 | 320.17 | 8.35 | 6.76 |
| A | Port 1 | 154.57 | 7.99 | 8.34 | 232.77 | 8.24 | 8.14 | 180.53 | 6.86 | 8.52 |
| | Port 2 | 214.43 | 7.41 | 8.26 | 237.93 | 7.64 | 8.05 | 244.20 | 8.43 | 7.88 |
| | Outlet | 122.37 | 6.09 | 8.85 | 184.30 | 6.52 | 8.89 | 201.43 | 6.64 | 8.82 |
| B | Port 1 | 117.53 | 8.21 | 9.67 | 165.70 | 8.51 | 9.37 | 99.53 | 7.01 | 9.44 |
| | Port 2 | 243.33 | 8.57 | 8.00 | 256.87 | 8.59 | 7.87 | 240.23 | 8.52 | 7.85 |
| | Outlet | 235.07 | 8.26 | 7.96 | 265.03 | 8.64 | 7.99 | 296.27 | 8.07 | 7.81 |
| C | Port 1 | 245.37 | 8.85 | 8.33 | 213.60 | 8.63 | 8.42 | 221.93 | 8.76 | 8.44 |
| | Port 2 | 240.20 | 8.85 | 8.26 | 219.83 | 8.60 | 8.38 | 247.63 | 8.84 | 8.28 |
| | Outlet | 246.17 | 8.74 | 8.23 | 253.93 | 8.92 | 8.33 | 257.60 | 8.86 | 8.30 |
| D | Port 1 | 246.83 | 8.54 | 8.08 | 268.80 | 7.79 | 7.67 | 271.23 | 8.32 | 7.59 |
| | Port 2 | −61.40 | 7.10 | 8.69 | 97.23 | 7.76 | 8.07 | 57.23 | 8.01 | 8.20 |
| | Outlet | −102.90 | 4.98 | 7.77 | 56.97 | 5.28 | 8.47 | 0.03 | 7.01 | 8.39 |

Nitrate Removal and Ammonia Generation

Figure 6:
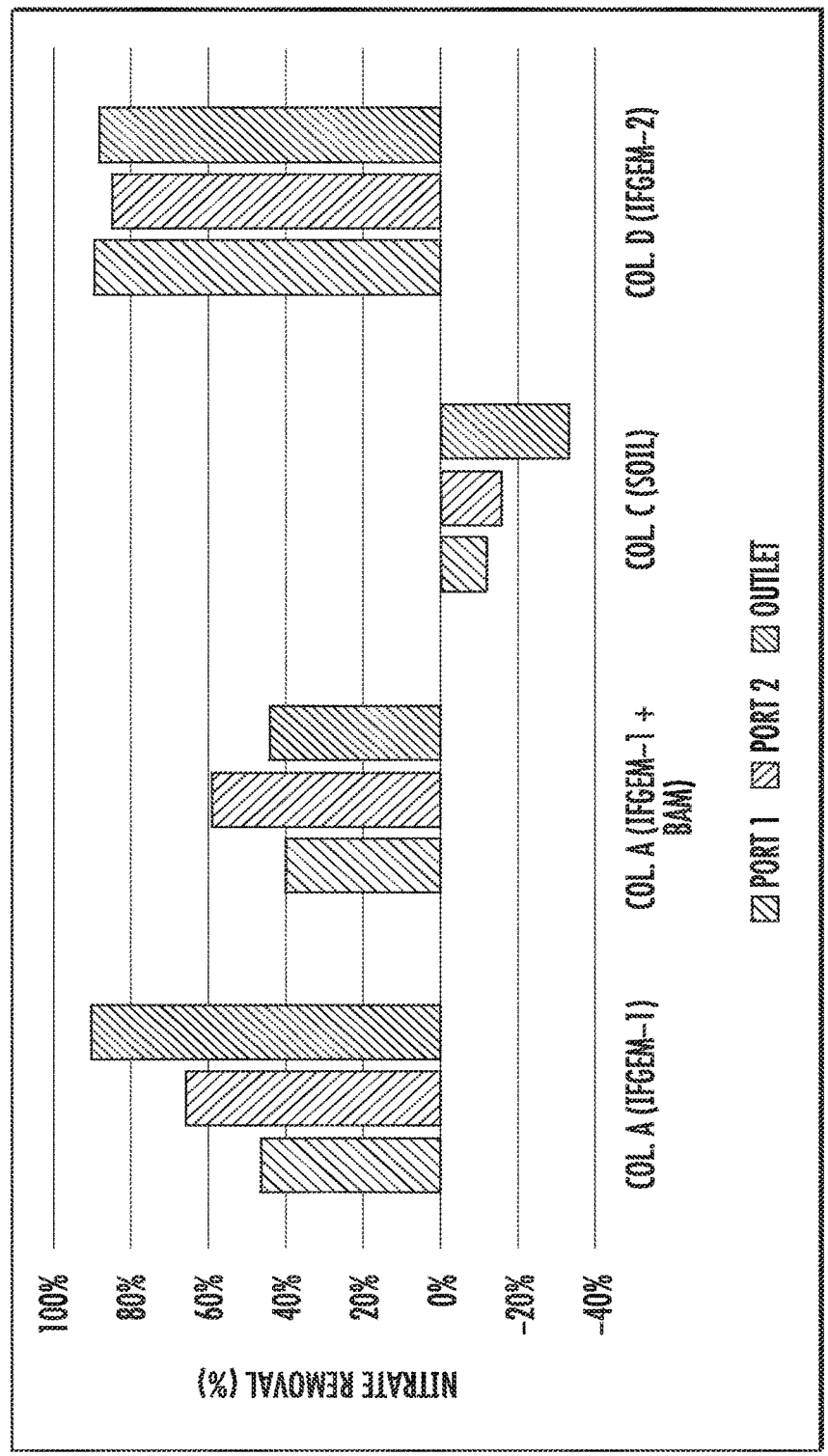
FIGS. 6 to 8 show the cumulative nitrate removal at each sampling port of the columns shown given the three different influent nitrate concentrations (denoted as level 1 to 3).
Figure 7:
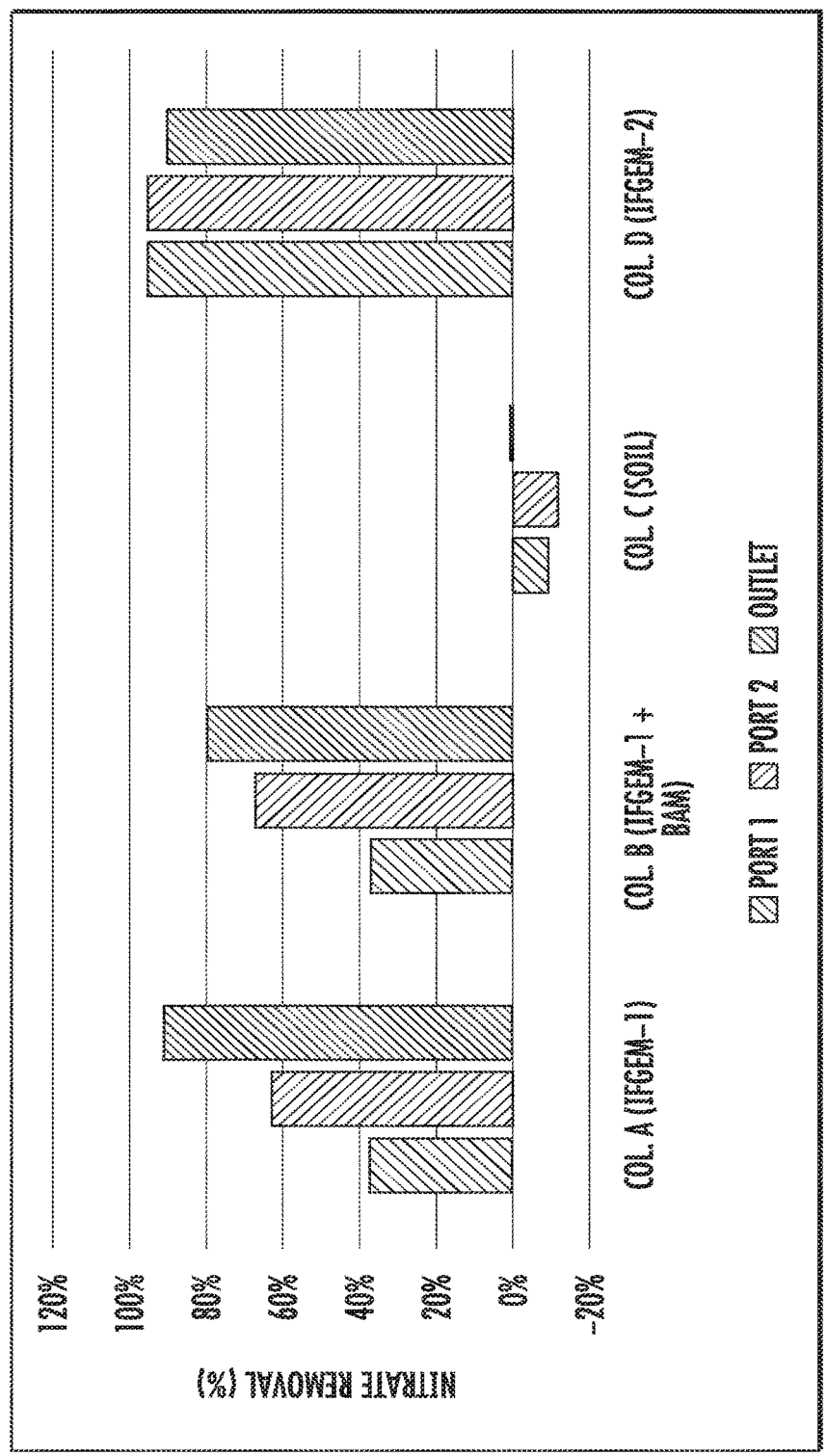
Figure 8:
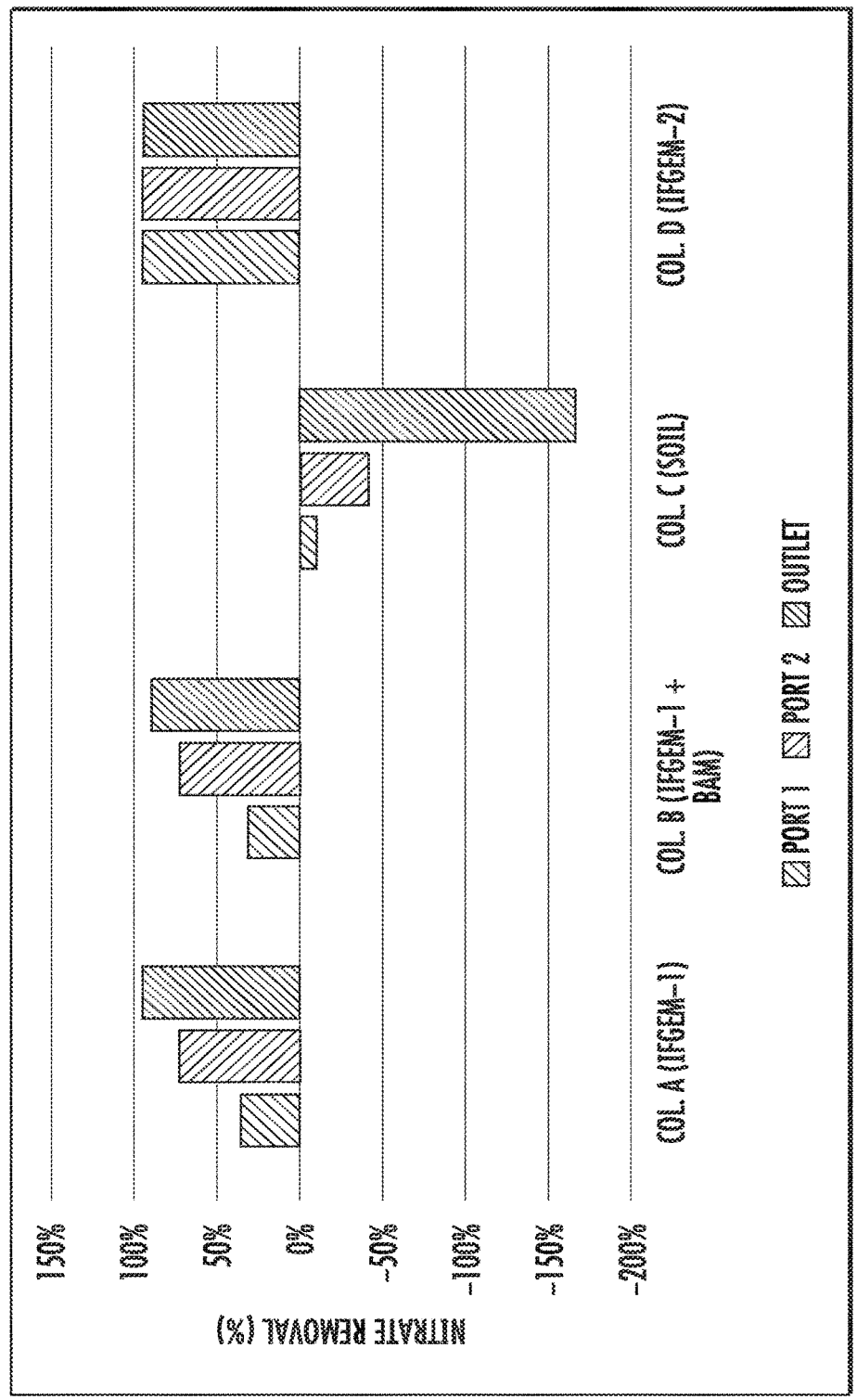

FIGS. 6 to 8 show the cumulative nitrate removal at each sampling port of the columns shown given the three different influent nitrate concentrations (denoted as level 1 to 3). Nitrate removals were observed in columns A, B, and D, while the control column C with natural soil showed negative or only minor removal. When the inlet nitrate concentration is 0.6 mg/L, columns A and D exhibit the highest nitrate removal of 91.01% and 88.32%, respectively. Column B shows moderate nitrate removal of 44.56%. When the inlet nitrate concentration became 1.2 mg/L, the overall removal of column A and D are 91.76% and 91.43%, respectively. While column B achieved 79.95% nitrate removal. When changing the inlet nitrate concentration to 1.8 mg/L, the overall removal of nitrate is up to 95.53% for column A, 94.49% for column D, and 75.85% for column B.

Figure 9:
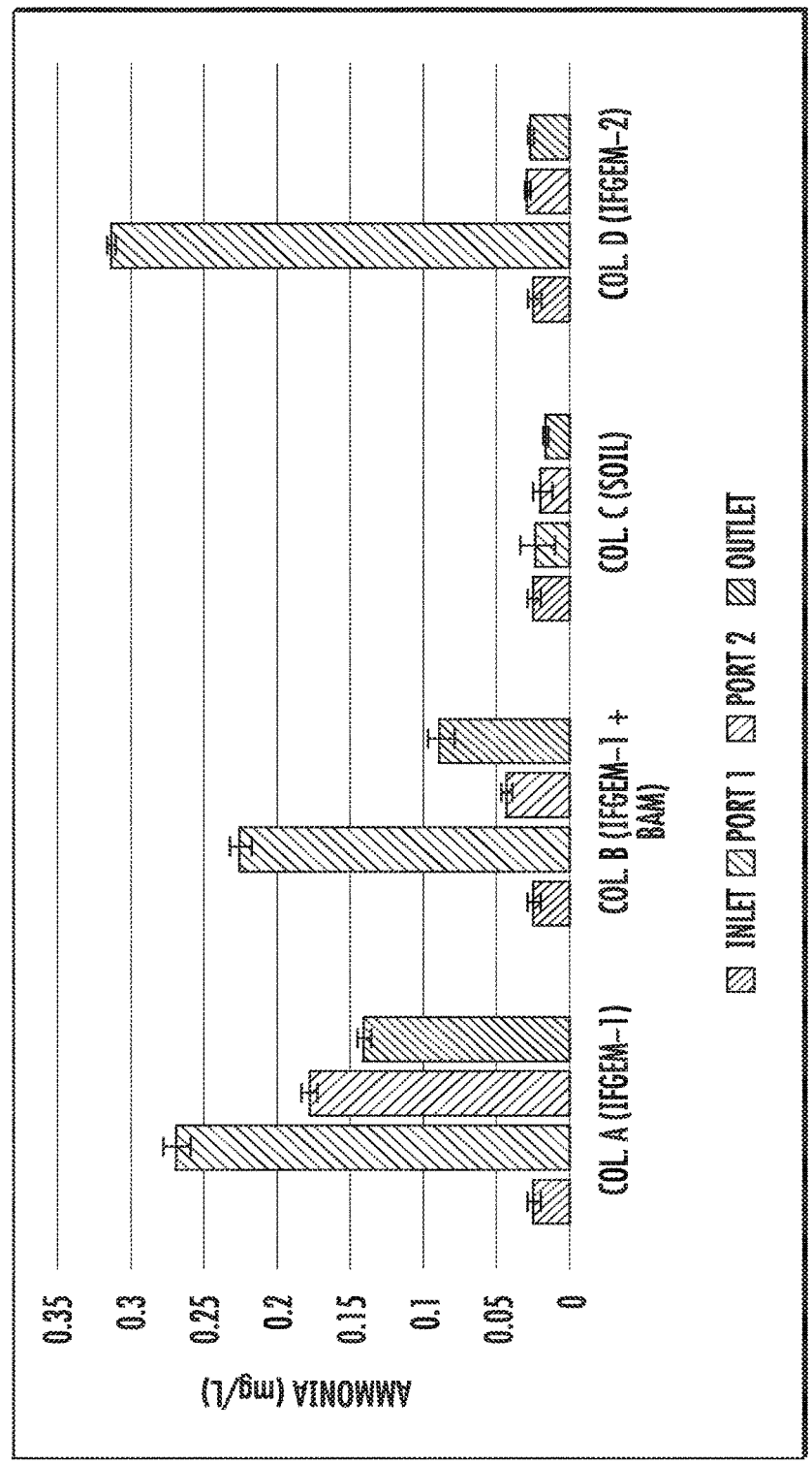
FIGS. 9 to 11 show the ammonia concentration data obtained from each sampling port for all columns at three different inlet nitrate concentration levels shown as 0.6 mg/L, 1.2 mg/L, and 1.8 mg/L, respectively.
Figure 10:
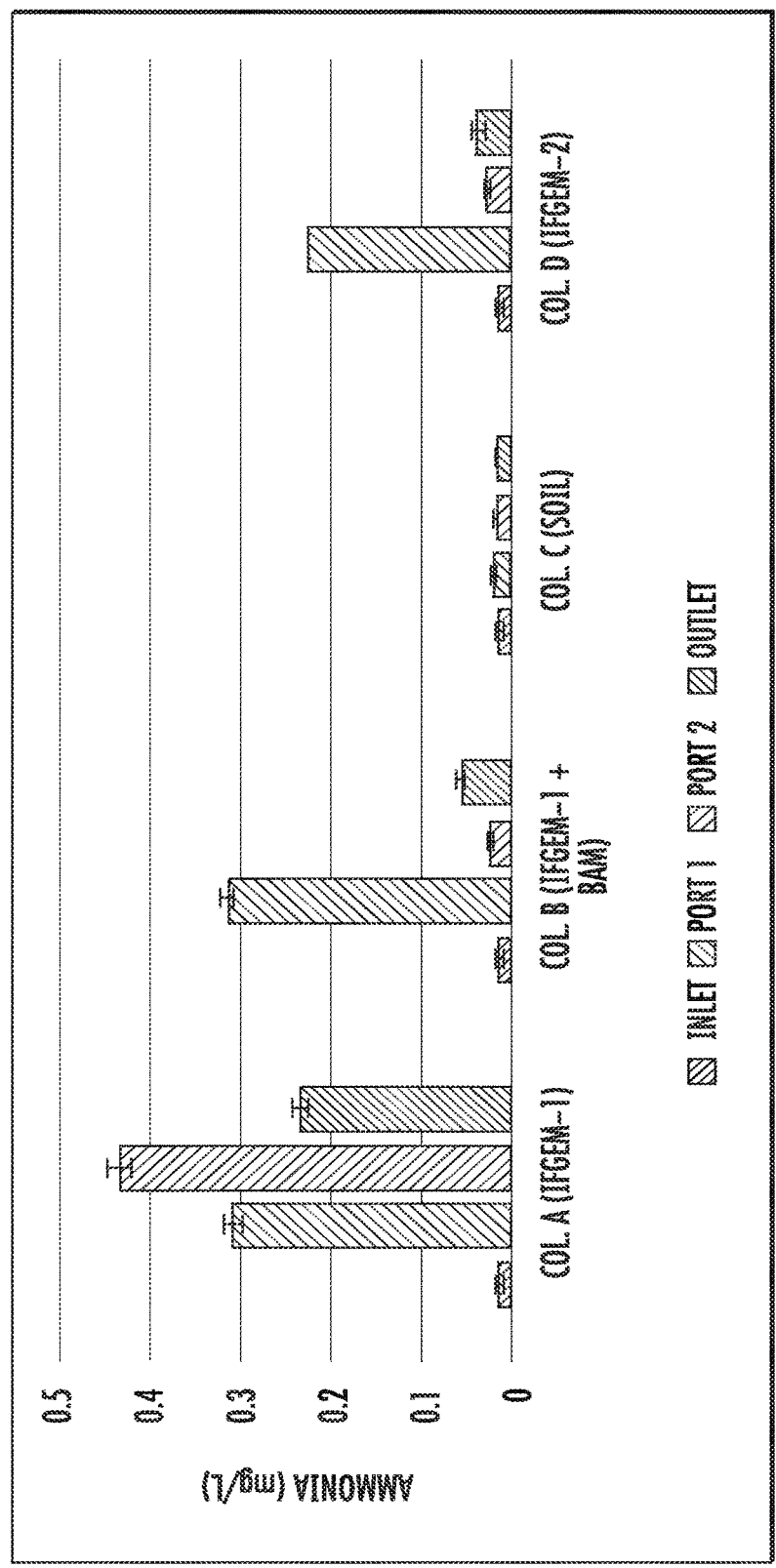
Figure 11:
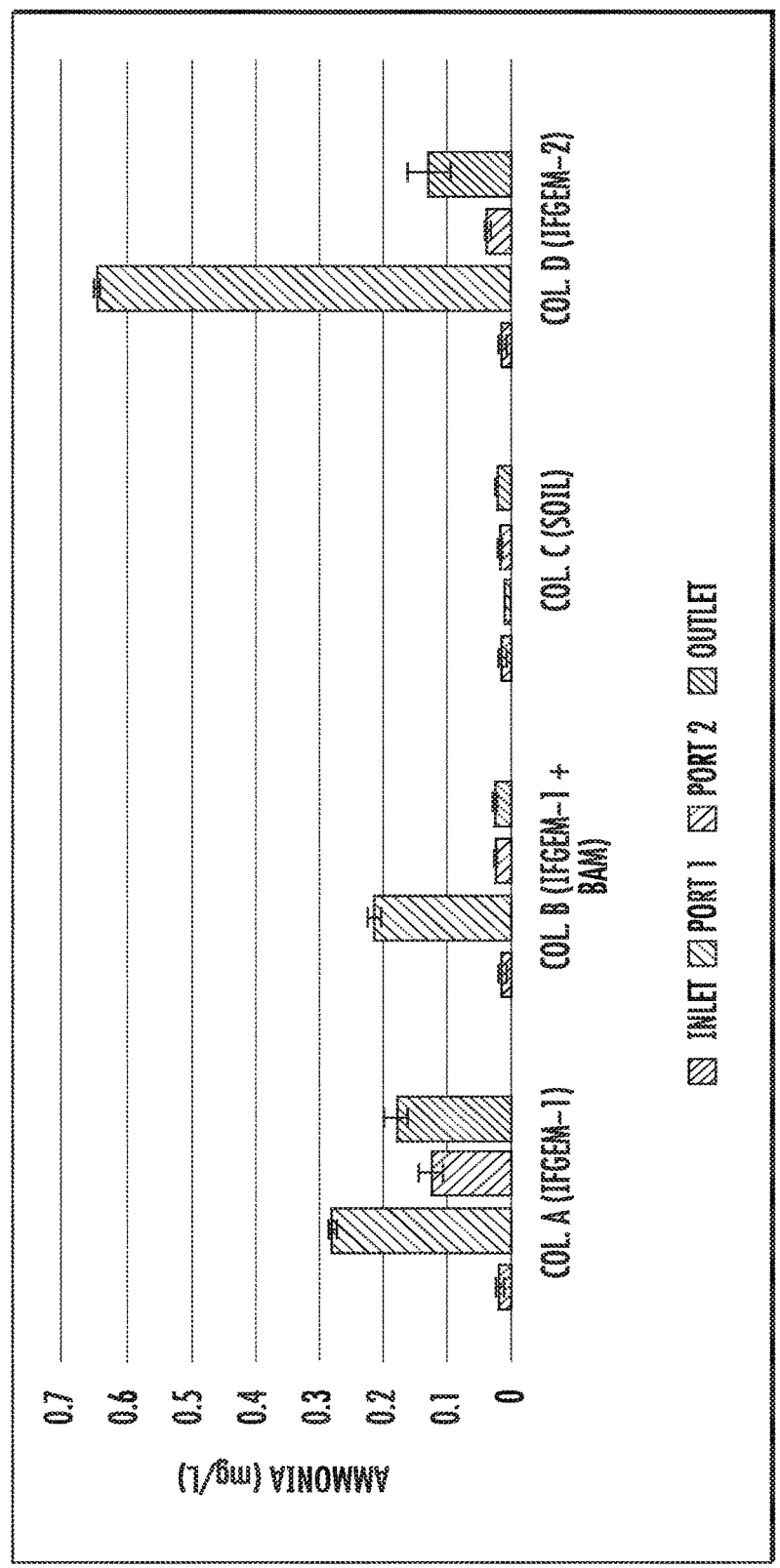

The generation of ammonia from the IFGEM treatment process is confirmed as the byproduct of nitrate reduction. Ammonia concentration data obtained from each sampling port for all columns are shown at three different inlet nitrate concentration levels in FIGS. 9 to 11, as 0.6 mg/L, 1.2 mg/L, and 1.8 mg/L, respectively. Ammonia generation seems positively related to the nitrate removal in the two IFGEM columns, particularly in the top sections. The higher the nitrate concentration, the more the ammonia being produced. It is noticeable that the ammonia concentration of the treated effluent is 7 to 23 times higher than that of the influent values from the column A test. Even though the first section of column D generates significant amount of ammonia, the treated effluent at the outlet shows negligible ammonia level. This is strong evidence that IFGEM 2 in the middle and lower sections adsorbed most of the ammonia being produced in the first section.

Phosphorus Removal

When the inlet TP=0.3 mg/L, the overall TP removal was 54.46% and 45.54%, respectively, for column A and D. When the inlet TP concentration became 0.5 mg/L, the overall TP removal is 71.90% and 26.14%, respectively, for column A and D. When the inlet TP increased to 0.7 mg/L, the overall TP removal changed to 82.53% and 62.45%, respectively, for column A and D. For column B, the first section showed similar removal effects as column A; but the following two sections exhibited negative removal of TP under concentration level 1 and 2 (−168.32% and −29.41%), then a much higher TP removal as 59.39% was achieved under concentration level 3. However, when it came to column C, the TP removal was mostly negative or negligible Results of Kinetics Study Nutrients cannot flow through in and out the flasks during the isotherm test, but the nutrients adsorption in column test is a function of both time and space as the water flow through the column (Table 10). In column A, the kinetics analysis showed that IFGEM1 mostly fits best in zero order, and the increase of influent nutrient concentration enhances the reaction rate constant from 0.0258 to 0.0809 for nitrate reduction and 0.007 to 0.0242 for phosphorus removal. The situation is similar for column D, where zero order dominates reaction kinetic. As the influent nutrient concentration increases, the rate constant changes from 0.0135 to 0.0388 for nitrate reduction and 0.0027 to 0.0106 for phosphorus removal. In column B, the nitrate reduction mainly follows zero order, and the rate constant increases from 0.0124 to 0.0551. However, the phosphorus removal kinetics under various influent concentrations are fluctuating and the R-squared values are relatively low in column B. For column C, its kinetics equation may not be precise because all R-squared values under three influent conditions are low for both nitrate reduction and phosphorus removal.

TABLE 1

Kinetics information of each column under various influent conditions

| column | Nutrient species | Concentration level 1 | $R^2$/ reaction order | Concentration level 2 | $R^2$/ reaction order | Concentration level 3 | $R^2$/ reaction order |
|---|---|---|---|---|---|---|---|
| A | Nitrate | y = −0.0258x + 0.6898 | 0.9593/ Zero | y = −0.0486x + 1.1884 | 0.9907/ Zero | y = −0.0809x + 1.8616 | 0.9744/ Zero |
|   | Phosphorus | y = −0.007x + 0.2746 | 0.5301/ Zero | y = −0.0141x + 0.4086 | 0.632/ Zero | y = −0.0242x + 0.5572 | 0.5538/ Zero |
| B | Nitrate | y = −0.0124x + 0.6138 | 0.4775/ Zero | y = 0.1372x + 0.6571 | 0.9896/ $2^{nd}$ | y = −0.0551x + 1.8511 | 0.9602/ Zero |
|   | Phosphorus | y = 0.027x + 0.2311 | 0.8537/ Zero | y = 0.0097x + 0.3317 | 0.2713/ Zero | y = −0.0128x + 0.5274 | 0.2632/ Zero |
| C | Nitrate | y = −0.0085x + 1.3361 | 0.9541/ $2^{nd}$ | y = 0.0003x + 1.2911 | 0.0049/ Zero | y = −0.0041x + 0.5331 | 0.8004/ $2^{nd}$ |
|   | Phosphorus | y = 0.0103x + 0.4281 | 0.6830/ Zero | y = −0.0142x + 1.6263 | 0.2803/ $2^{nd}$ | y = −0.0005x + 0.7253 | 0.0347/ Zero |
| D | Nitrate | y = −0.0135x + 0.5232 | 0.5389/ Zero | y = −0.0236x + 0.8296 | 0.518/ Zero | y = −0.0388x + 1.3747 | 0.6689/ Zero |
|   | Phosphorus | y = −0.0027x + 0.3015 | 0.4374/ Zero | y = −0.003x + 0.406 | 0.1786/ Zero | y = −0.0106x + 0.5627 | 0.4470/ Zero |

Zero, $1^{st}$, and $2^{nd}$ represent zero, first, and second order reactions, x = reaction time, here is HRT in column study; y = nutrient concentration (C) in effluent for Zero order reaction, ln(C) for $1^{st}$ order reaction, and 1/C for $2^{nd}$ order reaction.

Results of ANOVA Analysis

The two way ANOVA analysis was applied to test the following null hypothesizes for nitrate and TP removal separately. The following three hypotheses are employed in this study.

$H_1$: the average nutrient removals are the same between paired columns;

$H_2$: the average nutrient removals are the same among different inlet concentrations;

$H_3$: there is no interaction between columns and inlet concentrations in terms of nutrient removals.

From Table 11 the p values can be viewed with a 95% confidence for each paired column. Most of p values lie within the rejection region, which means there are significant differences between each paired column in terms of nutrient removal. However, there are several exceptions, for nitrate removal, there are no significant differences of the overall removal between column A and D as well as the interaction between the inlet condition and column type. Columns B and C also exhibit no significant differences in interaction from the column type and inlet conditions. For TP removal, the only exception is found between columns B and C, which showed they have no significant difference between their overall removals.

Nutrient Removal Interactions

The interactions between nutrient removal and sorption media are closely related to nitrate reduction process through IFGEMs, given both IFGEMs in columns A and D exhibited promising removal efficiencies with varying influent nutrient concentrations. IFGEM2 is more effective than IFGEM1 as IFGEM2 removes all the nitrate mainly through the top section while IFGEM1 needs three sections to perform equivalent removal efficiencies. The main reason of this outcome is that IFGEM2 contains clay that can accumulate the nitrate concentration around the iron surface through adsorption, which enhances the nitrate reduction process since the reduction reaction requires the close contact between iron surface and nitrate. Another reason is the longer HRT in IFGEM2 than IFGEM1 that caused by over 4 times higher BET surface area of IFGEM2 in unit weight, which mainly due to the existence of clay and tire crumb. This implies more contact time would be available for interactions between the nutrients and the sorption media on IFGEM2 rather than that in IFGEM1 in terms of nitrate reduction. Additionally, the faster decrement of ORP and DO concentration from each section in IFGEM2 is another crucial evidence indicating that the reaction intensity in IFGEM2 is more severe.

Not only the reactants, but also the products appear to be interacting with the sorption media. Ammonia are confirmed

TABLE 2

ANOVA analysis between paired columns with three inlet conditions

| compared aspects | A-B | A-C | A-D | B-C | B-D | C-D |
|---|---|---|---|---|---|---|
| Nitrate removal analysis | | | | | | |
| Columns | $2.76 \times 10^{-9}$ | $2.87 \times 10^{-17}$ | 0.1208 | $9.30 \times 10^{-14}$ | $7.22 \times 10^{-9}$ | $5.64 \times 10^{-17}$ |
| Inlet conditions | $1.37 \times 10^{-6}$ | $1.91 \times 10^{-7}$ | 0.0005 | $1.55 \times 10^{-8}$ | $1.07 \times 10^{-6}$ | $1.74 \times 10^{-7}$ |
| Interaction | $5.67 \times 10^{-6}$ | $1.05 \times 10^{-6}$ | 0.7538 | 0.7332 | $1.58 \times 10^{-5}$ | $3.44 \times 10^{-6}$ |
| Phosphorus removal analysis | | | | | | |
| Columns | $4.67 \times 10^{-10}$ | $7.62 \times 10^{-9}$ | $2.35 \times 10^{-5}$ | 0.6725 | $1.92 \times 10^{-8}$ | $1.75 \times 10^{-7}$ |
| Inlet conditions | $5.57 \times 10^{-9}$ | $5.66 \times 10^{-5}$ | $3.02 \times 10^{-4}$ | $4.47 \times 10^{-8}$ | $2.55 \times 10^{-8}$ | 0.0002 |
| Interaction | $9.49 \times 10^{-8}$ | 0.0039 | $5.35 \times 10^{-3}$ | 0.0026 | $9.25 \times 10^{-8}$ | 0.0014 | as one of the products of nitrate reduction reaction in IFGEMs. But the ammonia generation pattern and removal efficiencies are totally different across the two media, IFGEM1 and IFGEM2. By following the nitrate reduction pattern, IFGEM1 produces ammonia continuously throughout each section, while IFGEM2 mainly produces ammonia through the top section. However, the ammonia removal performance of IFGEM2 is much better than IFGEM1, which can be explained by looking at ammonia concentration from each section of column B (IFGEM1 on top, BAM at middle and bottom). When the newly produced ammonia flows from IFGEM1 section to BAM sections in column B, ammonia can be removed through BAM effectively, due to unique components of BAM such as clay and tire crumb that also exist in IFGEM2. Clay was found to be very effective for removing ammonia through an ion exchange mechanism. Ammonia was removed as one of the reduction products that could shift the nitrate reduction reaction equilibrium to the direction of reducing more nitrate, which is another reason that IFGEM2 has a higher reaction intensity compared to IFGEM1 in ammonia removal.

Figure 14:
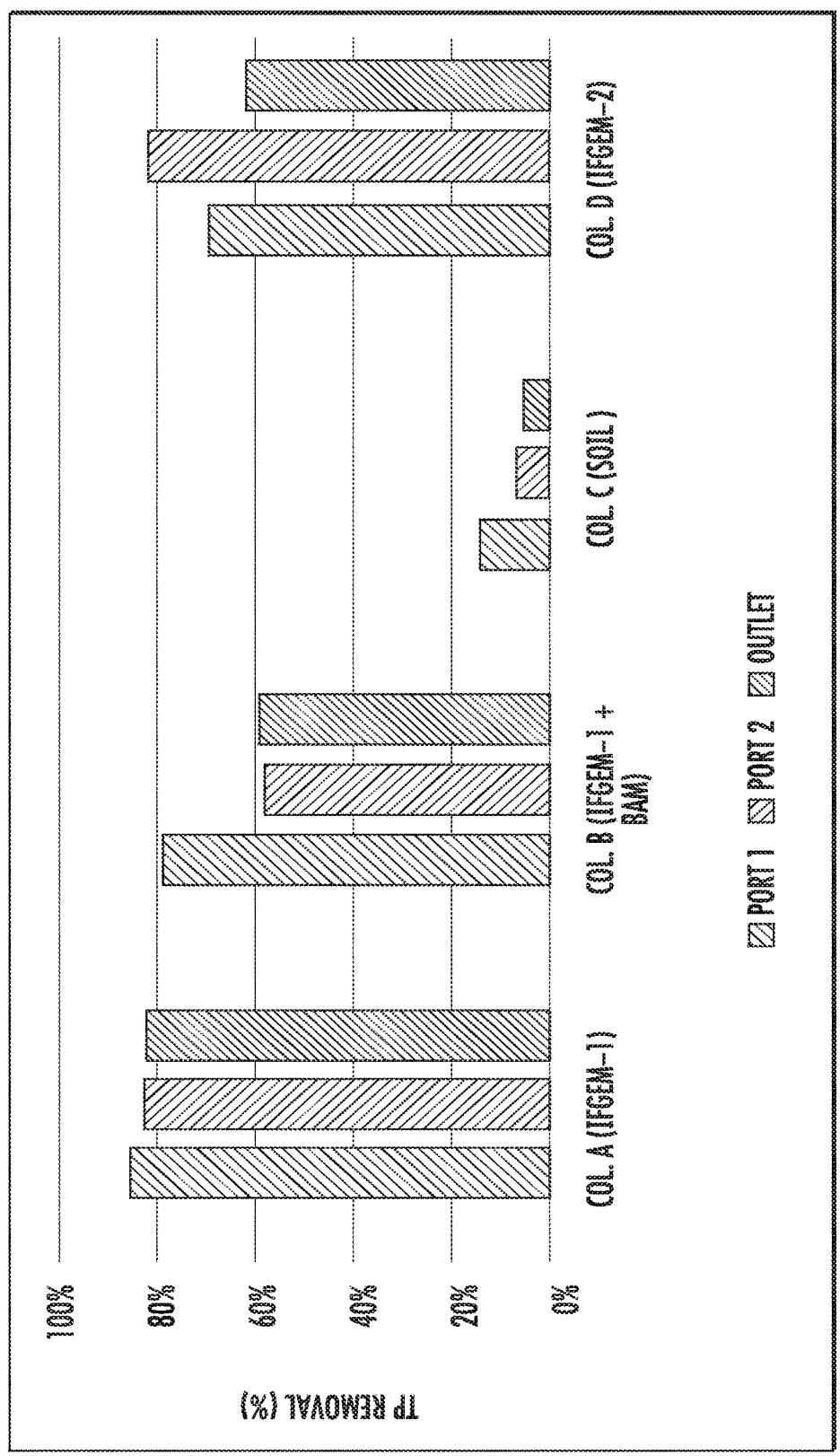
Figure 15:
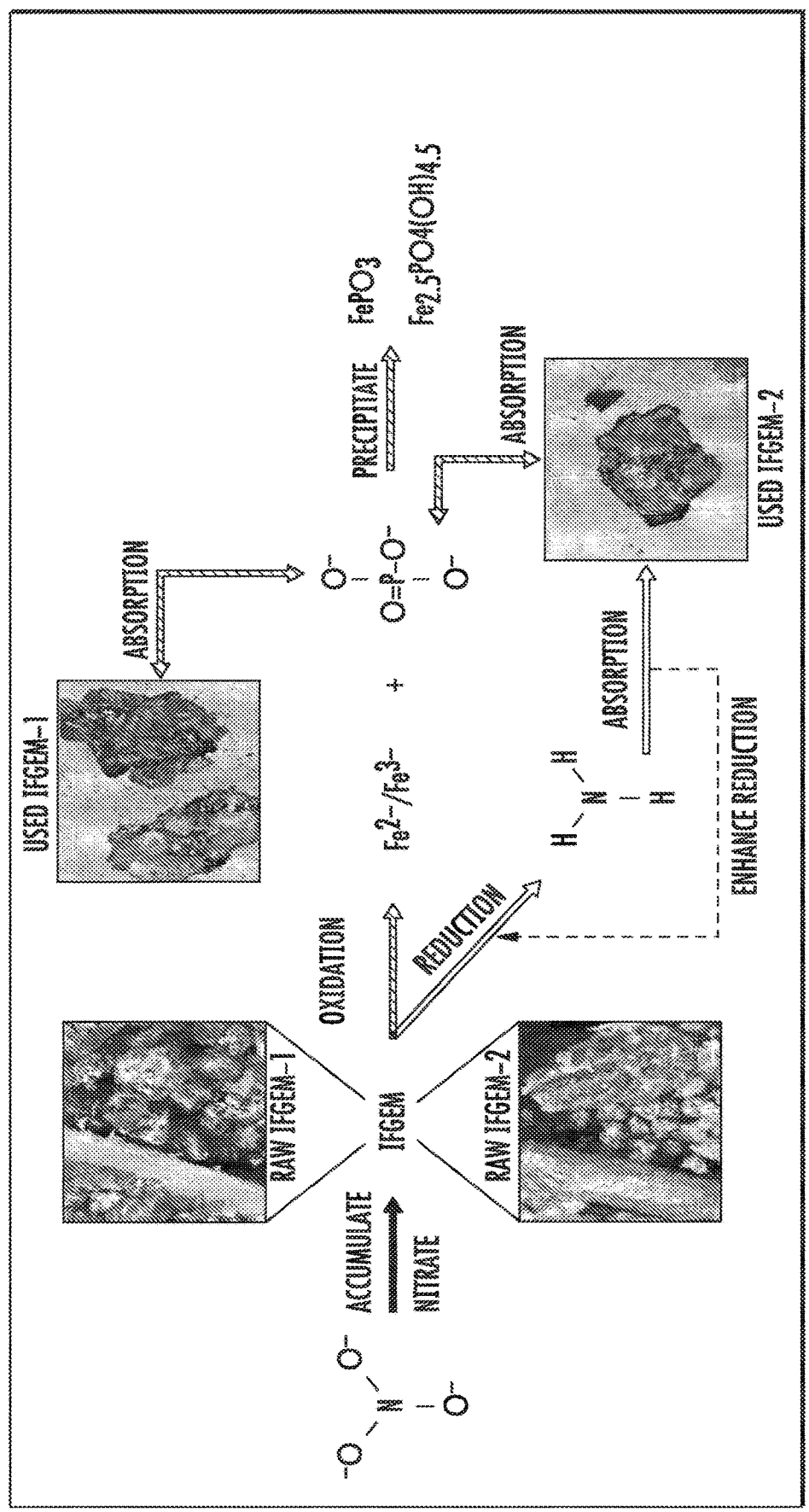
FIG. 15 shows nutrient removal interactions between nitrate and phosphate through IFGEM.

When taking into account the phosphorus removal, the synergetic effects among media, nitrate, and phosphorus can be realized fully as shown in FIG. 15. One of the products of nitrate reduction reaction are ferrous/ferric iron ion, which can result in precipitation into $FePO_4$ given the presence of phosphate ion. As the influent nitrate concentration increases, more ferrous/ferric ion can be generated in IFGEMs through nitrate reduction. Due to the precipitation equilibration, the increased concentration of ferrous/ferric ion shifts the equilibrium to the direction of precipitating more phosphorus in FIGS. 12 to 15, being TP 0.3 mg/L, 0.5 mg/L, and 0.7 mg/L. respectively.

The interaction can also be observed from reaction kinetics (Table 11), where rate constants of nitrate removal showed corresponding increment when the nitrate concentrations increased by 2 to 3 times, while the phosphorus removal rate constants showed similar or higher improvement when the TP concentration increases only up to 2.3 times as maximum. The better performance of TP removal in IFGEM1 is also the result of its lower intensity of nitrate reduction reaction when compared to IFGEM2. Because ORP (Table 9) decreases through the oxidation reduction reactions, the change of ORP could be one of the major factors that affects the phosphorus adsorption to iron. Phosphorus absorption capacity can be depressed by low ORP conditions within certain pH ranges. It can be suggested that IFGEM1 is suitable for places where require faster infiltration rate, more phosphorus removal, but not sensitive to ammonia generation. IFGEM2 is appropriate for applications with higher standard for nitrogenous removal but less demands for infiltration speed and phosphorus removal.

The nitrate removal from BAM layer (shown in FIGS. 6 to 8) is significantly different from IFGEMs (Table 11), mainly because it has no iron filings that work as reactive electron donors. So the BAM layer is more about absorption rather than reduction with limited absorption sites. When it comes to phosphorus removal, even in the best removal scenario with concentration level 3 in BAM, both IFGEMs can easily surpass column B because the lack of iron filings in BAM means no contribution from the iron bonded phosphorus precipitation/absorption. So the phosphorus removal of both column B (IFGEM1 and BAM) and column C (natural soil) has no statistical differences as none of them are good (Table 11). Especially natural soil, it shows mostly negative or negligible removals for both nitrate and phosphorus as treatment failures. It indicates that natural soil has been saturated with nutrient contaminants from stormwater runoff, it is no longer effective for removing nutrients from stormwater. The equivalent ORP values from each natural soil section (Table 9) also evidences that soil has lost almost all of its reactive sites for possible oxidation-reduction reactions, and clarified the necessity of replacing the existing natural soil in the study site.

pH Impacts and Competitive Absorption

The impacts of pH variation on nutrient removal in IFGEM were evaluated by the isotherm study in which nitrate and phosphorus were included in the test sequentially under pH value of 2, 7, and 10. Both Langmuir and Freundlich models were applied to search for the best fit based on the collected data. However, Langmuir model parameters are not applicable due to its assumption of monolayer reactive sites that may lose reactivity once being occupied and this assumption is not suitable for both IFGEMs as iron filing can provide electrons layer by layer continuously. Both IFGEMs tend to show decrement in phosphorus absorption as the pH value increases. The reason for having such a trend might be due to the status differences of iron-based ion under different pH values. When the initial pH is acidic, the dominant dissolved iron ion is Fe(III) or Fe(II), which may strengthen the phosphorus precipitation (Eq. 8 and 9) as the spontaneity of the phosphorus removal is enhanced due to more Fe(III) or Fe(II) are available (Table 8 and Table 9).

Figure 12:
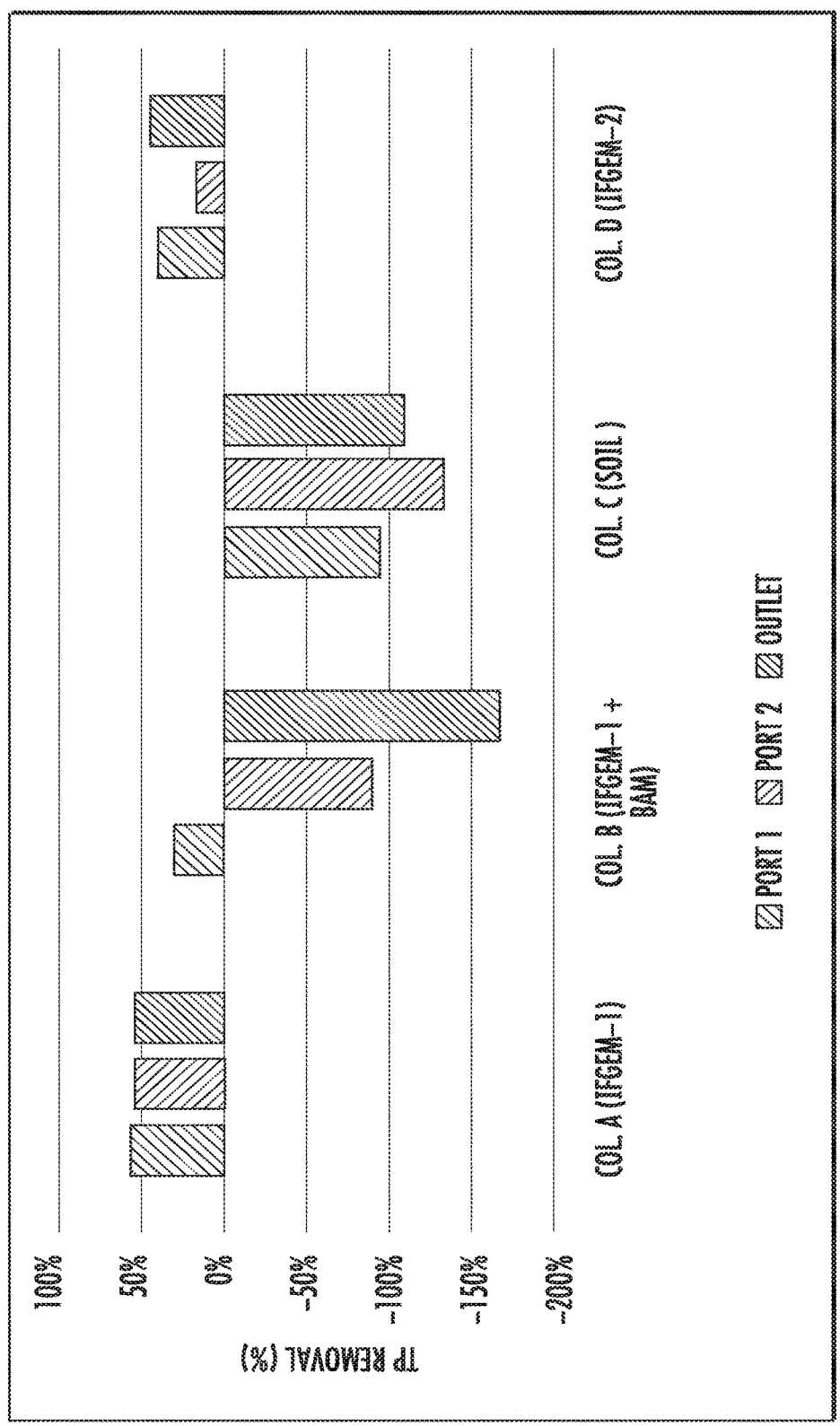
FIGS. 12 to 14 show the total phosphorus (TP) removal when the inlet TP=0.3 mg/L, 0.5 mg/L, and 0.7 mg/L, respectively.
Figure 13:
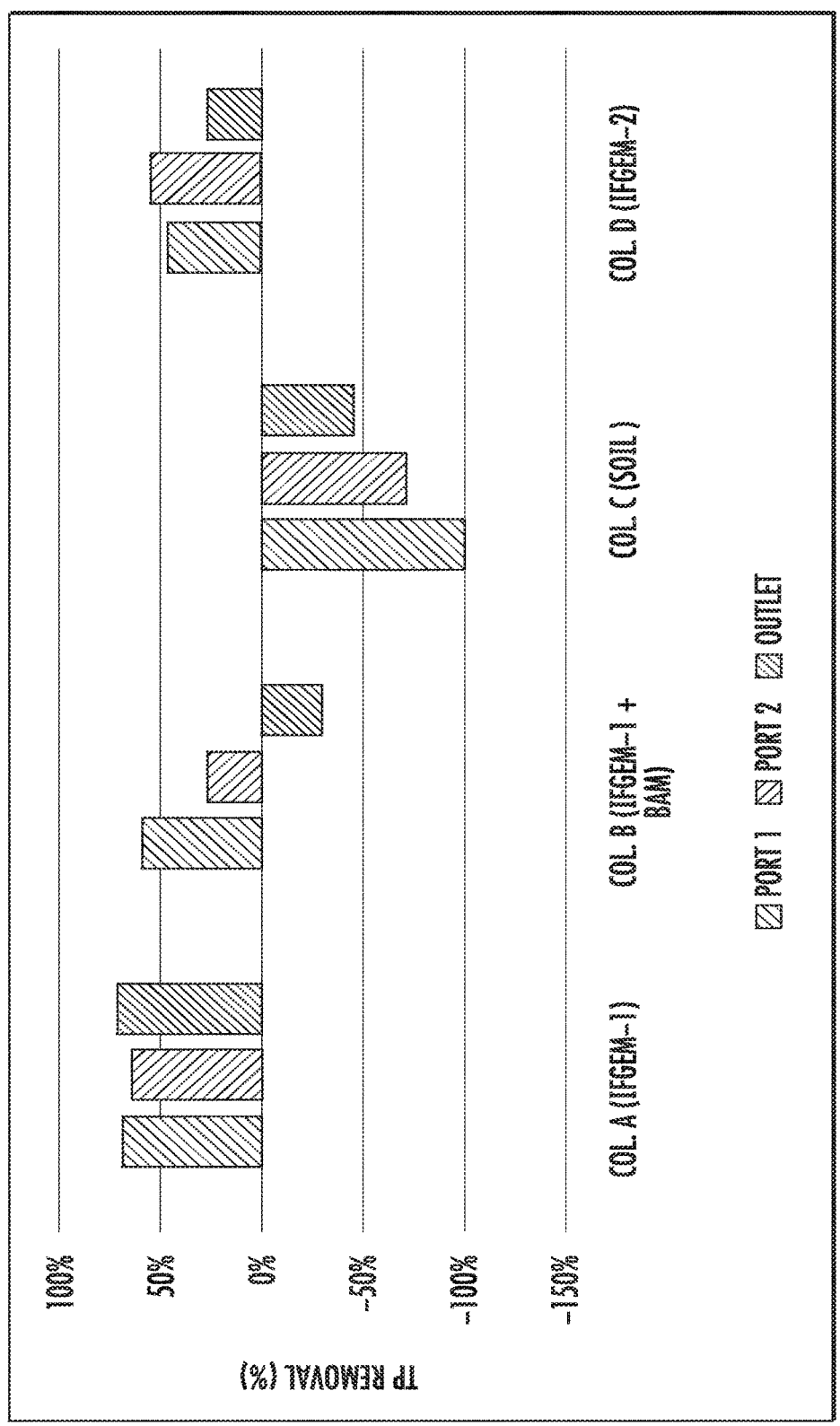

However, when the solution turns into the basic condition, the iron ion tends to form $Fe(OH)_3$ with low solubility, resulting in less Fe(III) or Fe(II) are available for phosphate precipitation. Another reason might be due to the competition between anions of $OH^-$ and phosphate for absorption sites. The higher the pH value is, the more $OH^-$ to compete with the phosphate for the positive absorption site, from the Gibbs free energy perspective, more energy is required for initializing the reaction (Table 7 and Table 8). Note that IFGEM1 is generally better than IFGEM2 in phosphorus removal under all pH conditions in the isotherm study, and the same result can be observed from the column study as well as shown in FIGS. 12 to 14 which shows the total phosphorus (TP) removal when the inlet TP=0.3 mg/L, 0.5 mg/L, and 0.7 mg/L, respectively. The performance of IFGEM1 was more effective and stable for phosphorus removal. This could be interpreted by the ORP values as well (Table 9). In certain range of pH, ORP could exhibit a positive correlation with iron bonded phosphorus absorption. Since the ORP drops faster in IFGEM2 than IFGEM1 as shown in Table 10, IFGEM1 is more likely to be applied for phosphorus removal than IFGEM2.

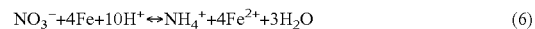

$$NO_3^- + 4Fe + 10H^+ \leftrightarrow NH_4^+ + 4Fe^{2+} + 3H_2O \quad (6)$$

$$2Fe + 6H^+ \rightarrow 2H_2\uparrow + 2Fe^{3+} \quad (7)$$

$$PO_4^{3-} + Fe^{3+} \rightarrow FePO_4\downarrow \quad (8\text{-}a)$$

$$2PO_4^{3-} + Fe^{2+} \rightarrow Fe_3(PO_4)_2\downarrow \quad (8\text{-}b)$$

$$Fe^{3+} + 3OH^- \rightarrow Fe(OH)_3\downarrow \quad (9\text{-}a)$$

$$Fe^{2+} + 2OH^- \rightarrow Fe(OH)_2\downarrow \quad (9\text{-}b)$$

Figure 16:
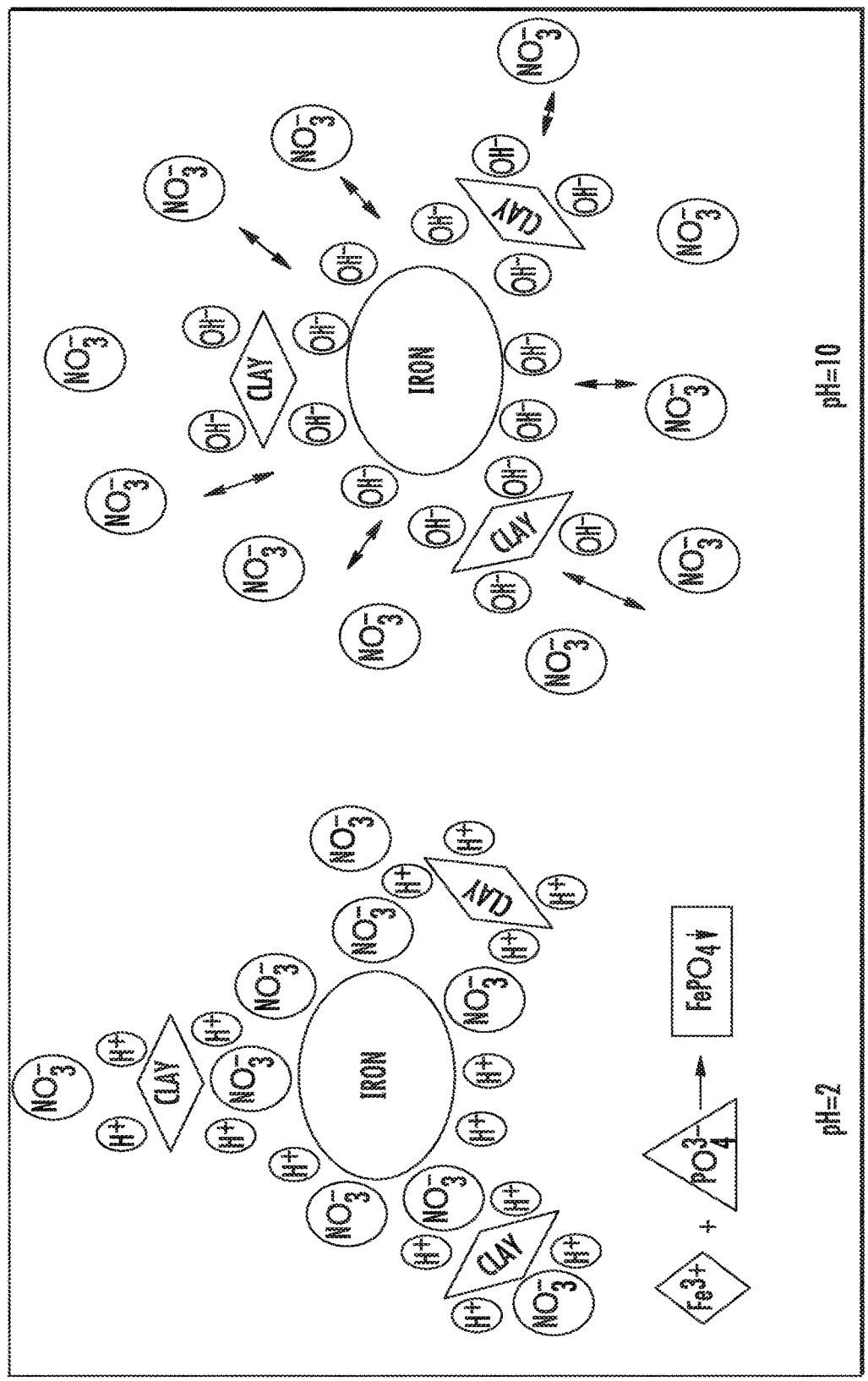
FIG. 16 shows the pH impacts on nitrate removal/reduction for IFGEM2.

Comparatively, IFGEM1 and IFGEM2 act differently in nitrate reduction and ammonia generation under different pH values. IFGEM1 removes most nitrate and generate more ammonia under neutral condition. Either the increase or the decrease pH value in solution would negatively impact its nitrate removal and ammonia generation. This process is graphically depicted in FIG. 16 which shows pH impacts on nitrate removal/reduction for IFGEM2. Since nitrate reduction generally requires close contact between iron surface and nitrate ion, highly concentrated hydrogen ion in acidic solution can compete with the nitrate ion for obtaining electrons from zero valent iron, and the dominate reaction would be Eq. 7 at this moment. When it comes to basic solution, similar competition was observed between highly concentrated hydroxyl ion and nitrate ion, both of which are anion.

Conversely, as nitrate attracted by clay on the surface, it is more about absorption rather than reactions when compared to the acidic condition. Different from IFGEM1, acidic solution is preferred by IFGEM2. Clay cannot absorb huge amount of nitrate, but it can adsorb nitrate to form a skinny layer with much higher nitrate concentration to interact with iron filing, which help achieve excellent nitrate removal in the column study. The existence of clay in IFGEM2 that interacts with pH fluctuations is graphically described in FIG. 16. When the initial ph=2 in the solution, the hydrogen ions occupy the negative charged sites on clay which makes the surface of clay more positively charged, making clay become more attractive to nitrate ion and enhancing the nitrate reduction process. However, the opposite side happens when changing the initial pH to 10 in solution. When the highly concentrated hydroxyl ions occupy the positive charged sites on the surface of clay, then the nitrate ion shall be repulsed because it is an anion, resulting in lower nitrate reduction.

Even though the two IFGEMs behave differently for nitrate reduction and removal when pH increases from 2 to 10, both of them follows the same trend for phosphorus removal. The reasons for having such outcome have been explained in the previous section. Accordingly, IFGEM1 is preferable for treating water with neutral pH values for the purpose of optimizing the nitrate removal. But IFGEM2 could be an alternative for treating acidic water to optimize both nitrate and phosphorus removal. Note that the more nitrate can be removed/reduced in both IFGEM, the more ammonia shall be generated. General speaking, IFGEM2 has a better ammonia generation and recovery capability.

Figure 17:
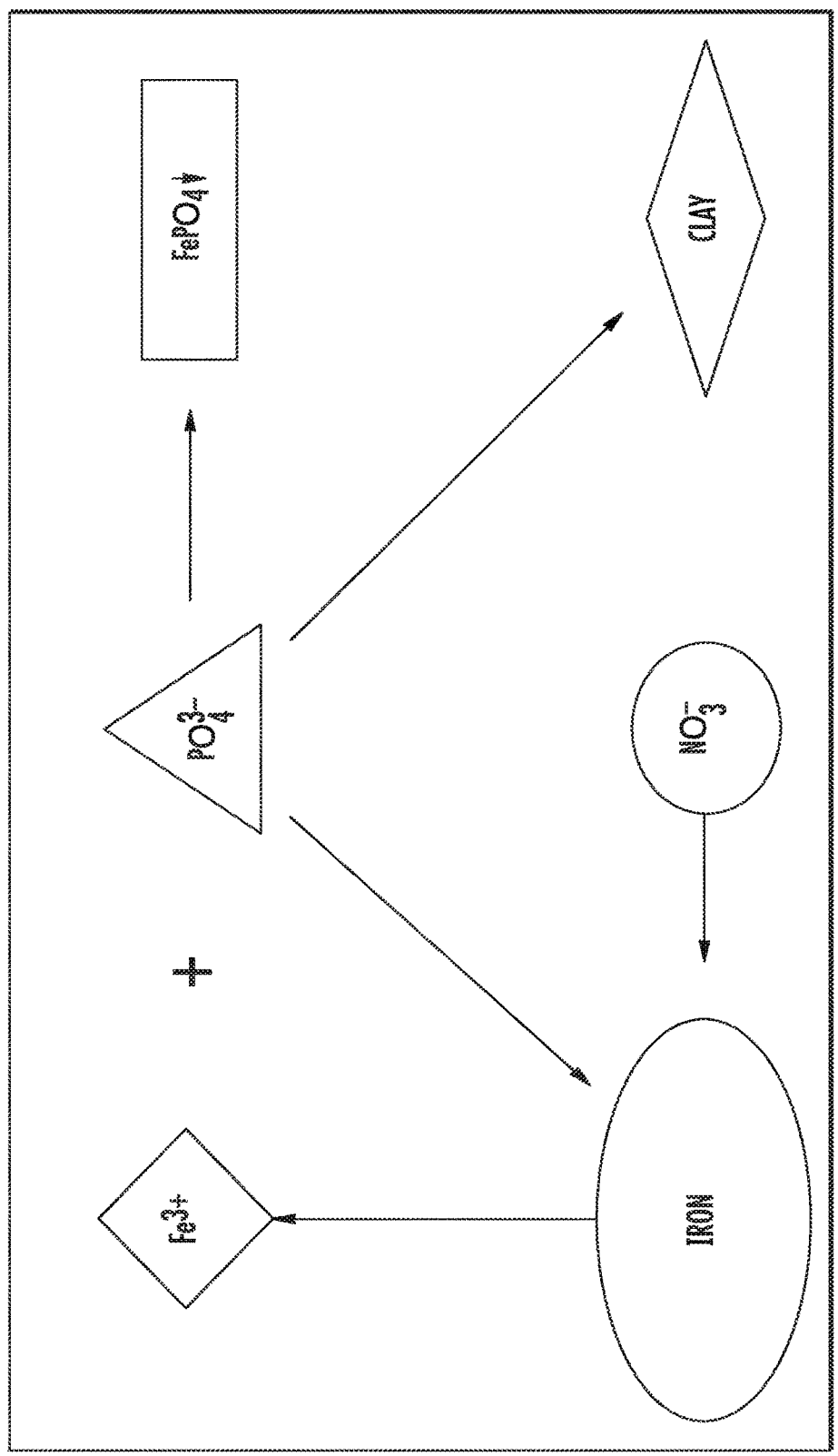
FIG. 17 shows competitive absorption between nitrate and phosphorus for IFGEM2.

The competitive absorption test was conducted in a batch-mode isotherm study for both IFGEMs, so that the nitrate and phosphorus removal capability can be compared in between scenarios that contain singular nutrient species and multiple nutrient species. Note that the batch mode study has very different hydraulic conditions when compared with the continuous flow in a column study. In isotherm study, the nutrients cannot flow in or out as the batch mode is basically a closed system. For IFGEM1, when both nutrients coexists in the solution, it seems that phosphorus is less competitive than nitrate. This may be confirmed by the fact that the removal of phosphorus reduces by 60.22% while the removal of nitrate only reduces 38.80%. As shown in FIG. 17, for a competitive absorption between nitrate and phosphorus for IFGEM2, clay is the major factor that changes the balance in the competition, as clay is good for phosphorus removal as compensation to the decrement in phosphorus precipitation. It is noted that the batch-mode study provides one more aspect to look into the mechanism of competitive nutrients removal. However, it could be very different in continuous mode due to the significant change in hydraulic conditions, flow speed at the intersection between solid and liquid, nutrients concentration patterns and so on.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

The invention claimed is:

1. A method of water treatment, comprising:
   flowing water that includes nitrogen and phosphorus compounds through a sorption media composition within at least one chamber of a water treatment system, said composition comprising:
   iron filings comprising at least 5 volume (vol) of said composition;
   sand particles comprising at least 10 vol % of said composition; and
   clay particles comprising at least 2 vol % of said composition,
   wherein said iron filings, said sand particles, and said clay particles are mixed together,
   wherein said iron filings and said clay particles act synergistically to remove said nitrogen and said phosphorous compounds from said water, and
   wherein during said flowing said clay particles attract said nitrogen and said phosphorus compounds which become absorbed onto a surface of said iron filings and said clay particles resulting in a removal of said nitrogen and said phosphorus compounds and a generation of reaction products.

2. The method of claim 1, wherein said composition further comprises at least one recycled material selected from tire crumb and paper.

3. The method of claim 1, wherein said reaction products generated comprise ammonia and ferrous iron.

4. The method of claim 1, wherein said water comprises stormwater runoff, wastewater effluent, or agricultural discharge.

5. The method of claim 1, wherein said clay particles are 2 vol % to 10 vol % of said composition.

6. The method of claim 1, wherein a porosity of said composition is 30% to 50%.

7. The method of claim 1, further comprising using said nitrogen and said phosphorus as a soil amendment.

8. The method of claim 1, wherein an average size of said clay particles than an average size of the iron filings and an average size of the sand particles.

9. The method of claim 8, wherein said average size of said clay particles is between 0.2 μm and 5 μm.

10. A method of water treatment, comprising:
    flowing water that includes nitrogen and phosphorus compounds through a sorption media composition within at least one chamber of a water treatment system, said composition comprising:
    iron filings comprising at least 5 volume (vol) of said composition;
    sand particles comprising at least 10 vol % of said composition;
    clay particles comprising at least 2 vol % of said composition; and
    at least one recycled material selected from tire crumb, wood sawdust, and paper,
    wherein said iron filings, said sand particles, said clay particles, and said recycled material are mixed together,
    wherein said iron filings and said clay particles act synergistically to remove said nitrogen and said phosphorous compounds from said water, and wherein during said flowing said clay particles attract said nitrogen and said phosphorus compounds which become absorbed onto a surface of said iron filings and said clay particles resulting in a removal of said nitrogen and said phosphorus compounds and a generation of reaction products including ammonia and ferrous iron.

11. The method of claim 10, wherein said clay particles are 2 vol % to 10 vol % of said composition, and wherein an average size of said clay particles is less than an average size of the iron filings and an average size of the sand particles.

* * * * *

UNITED STATES PATENT AND TRADEMARK OFFICE
CERTIFICATE OF CORRECTION

PATENT NO. : 10,696,567 B2  
APPLICATION NO. : 16/398050  
DATED : June 30, 2020  
INVENTOR(S) : Ni-Bin Chang and Martin P. Wanielista Page 1 of 1

It is certified that error appears in the above-identified patent and that said Letters Patent is hereby corrected as shown below:

In the Specification

In Column 1, Lines 15-20 should read:
This invention was made with Government support under Grant No. ICER 1830036 awarded by the National Science Foundation and U.S. Department of Transportation Federal Aid No. HR01-055-H as awarded by the Florida Department of Transportation. The government has certain rights in the invention.

In the Claims

Column 22, Claim 1, Line 13 should read:
iron filings comprising at least 5 volume (vol) % of said Column 22, Claim 8, Line 45 should read:
clay particles is less than an average size of the iron filings and an Column 22, Claim 10, Line 54 should read:
iron filings comprising at least 5 volume (vol) % of said Signed and Sealed this  
Twenty-second Day of December, 2020

Andrei Iancu  
*Director of the United States Patent and Trademark Office*